(12) United States Patent
Fuse

(10) Patent No.: US 7,917,038 B2
(45) Date of Patent: Mar. 29, 2011

(54) MULTIMODE OPTICAL TRANSMISSION DEVICE

(75) Inventor: Masaru Fuse, Osaka (JP)

(73) Assignee: Panasonic Corporation, Osaka (JP)

( * ) Notice: Subject to any disclaimer, the term of this patent is extended or adjusted under 35 U.S.C. 154(b) by 370 days.

(21) Appl. No.: 11/660,155

(22) PCT Filed: Jul. 26, 2005

(86) PCT No.: PCT/JP2005/013633
§ 371 (c)(1),
(2), (4) Date: Jan. 17, 2008

(87) PCT Pub. No.: WO2006/018952
PCT Pub. Date: Feb. 23, 2006

(65) Prior Publication Data
US 2008/0240734 A1    Oct. 2, 2008

(30) Foreign Application Priority Data

Aug. 20, 2004 (JP) .................. 2004-241069
Aug. 20, 2004 (JP) .................. 2004-241070

(51) Int. Cl.
*H04B 10/12* (2006.01)
(52) U.S. Cl. .............. 398/140; 398/77; 398/78; 398/79; 398/89
(58) Field of Classification Search .......... 398/140, 398/77
See application file for complete search history.

(56) References Cited

U.S. PATENT DOCUMENTS

| | | | |
|---|---|---|---|
| 4,703,474 A * | 10/1987 | Foschini et al. ........... | 370/441 |
| 4,779,266 A * | 10/1988 | Chung et al. ............. | 370/441 |
| 4,866,699 A | 9/1989 | Brackett et al. | |
| 5,086,222 A * | 2/1992 | Shibuya .................... | 250/234 |
| 5,258,821 A * | 11/1993 | Doggett et al. ........... | 356/496 |
| 5,784,506 A | 7/1998 | Pfeiffer | |
| 6,038,357 A * | 3/2000 | Pan ........................... | 385/24 |
| 6,381,053 B1 * | 4/2002 | Fathallah et al. ......... | 398/99 |
| 6,404,528 B1 * | 6/2002 | Pfeiffer .................... | 398/202 |
| 7,324,755 B2 * | 1/2008 | Izadpanah ................ | 398/78 |
| 7,555,216 B2 * | 6/2009 | Yoshino et al. ........... | 398/77 |

(Continued)

FOREIGN PATENT DOCUMENTS

DE       197 22 370       12/1998

(Continued)

OTHER PUBLICATIONS

Viv McInally, Multimode Fibre: The Progression Towards Multi-Gigabit Speeds & the 850nm Opearting wavelength, May 2002, Corning Inc, p. 1-3.*

(Continued)

*Primary Examiner* — Ken N Vanderpuye
*Assistant Examiner* — Tanya Ngo
(74) *Attorney, Agent, or Firm* — Wenderoth, Lind & Ponack, L.L.P.

(57) ABSTRACT

An optical transmitting circuit (2) modulates multimode oscillation light using an information signal, subjects at least one oscillation-mode light beam of the multimode oscillation light to a predetermined operation, and outputting the result to an optical transmission channel. An optical receiving circuit (8) receives an optical signal transmitted through the optical transmission channel, subjects the received optical signal to an operation reverse to the predetermined operation to recover an optical signal as it was before being subjected to the predetermined operation, and converting the recovered optical signal into an electrical signal, thereby reproducing the information signal.

2 Claims, 19 Drawing Sheets

U.S. PATENT DOCUMENTS

| | | | |
|---|---|---|---|
| 7,689,124 B2 * | 3/2010 | Yeon et al. | 398/78 |
| 7,755,073 B2 * | 7/2010 | Kim et al. | 250/566 |
| 7,792,427 B1 * | 9/2010 | Uhlhorn et al. | 398/77 |
| 2002/0030868 A1 * | 3/2002 | Salomaa | 359/124 |
| 2002/0067883 A1 * | 6/2002 | Lo | 385/24 |
| 2002/0150334 A1 * | 10/2002 | Richardson et al. | 385/37 |
| 2002/0163696 A1 * | 11/2002 | Huang et al. | 359/154 |
| 2003/0021032 A1 * | 1/2003 | Bamji et al. | 359/568 |
| 2003/0035187 A1 * | 2/2003 | Richardson et al. | 359/189 |
| 2003/0063346 A1 * | 4/2003 | Pez et al. | 359/118 |
| 2004/0037500 A1 * | 2/2004 | Yoo | 385/31 |
| 2004/0141499 A1 * | 7/2004 | Kashima et al. | 370/380 |
| 2005/0023450 A1 * | 2/2005 | Ito | 250/231.13 |
| 2007/0122153 A1 * | 5/2007 | Tamai | 398/77 |
| 2008/0107430 A1 * | 5/2008 | Jackel | 398/188 |

FOREIGN PATENT DOCUMENTS

| | | |
|---|---|---|
| EP | 0 790 720 | 8/1997 |
| EP | 1 280 290 | 1/2003 |
| JP | 3-16334 | 1/1991 |
| JP | 9-205420 | 8/1997 |
| JP | 2002-9865 | 1/2002 |
| JP | 2003-110503 | 4/2003 |
| JP | 2003-115869 | 4/2003 |

OTHER PUBLICATIONS

European Search Report issued Dec. 28, 2007 in the corresponding European application.

* cited by examiner

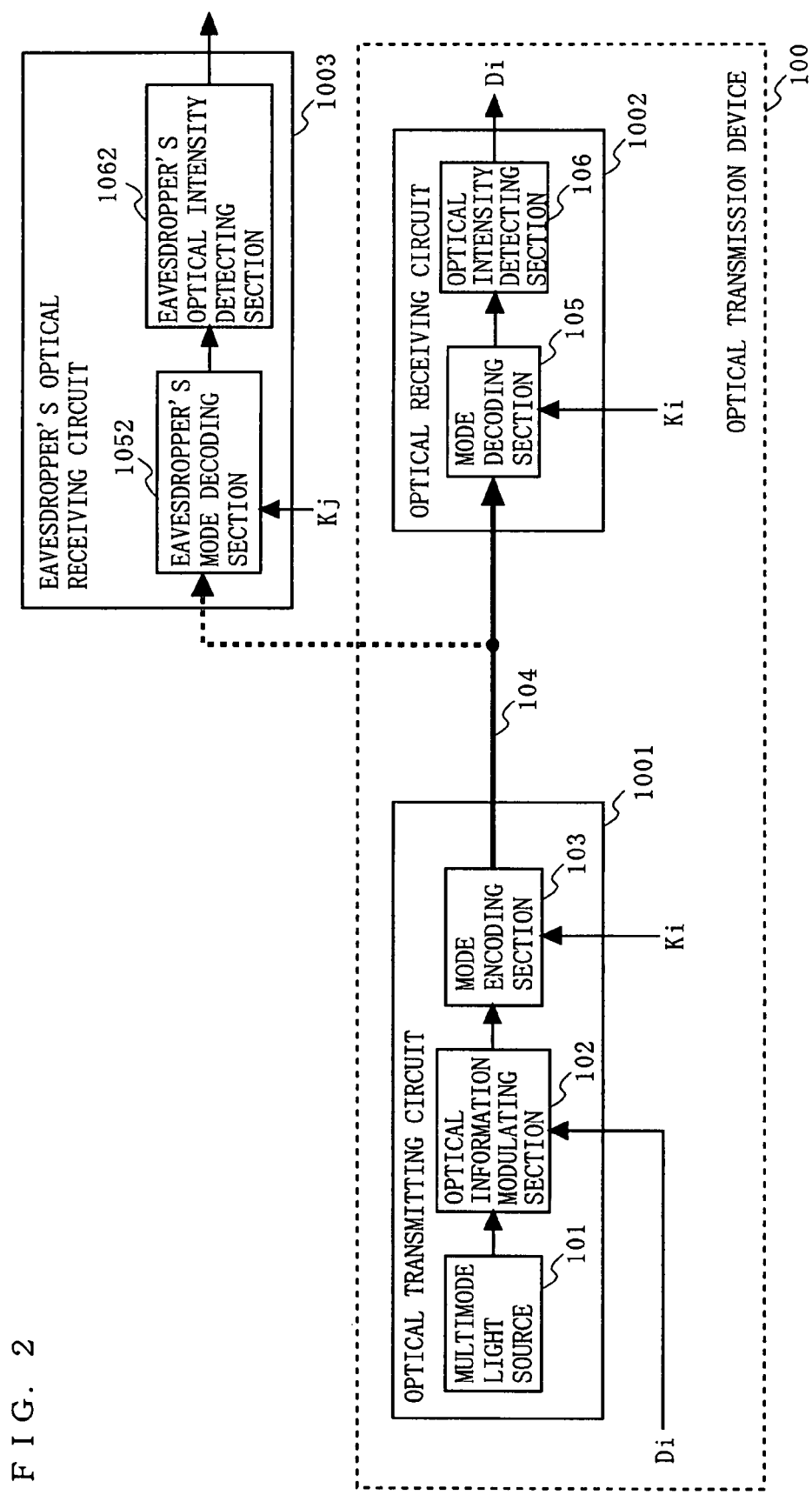
F I G. 2

MULTIMODE OPTICAL TRANSMISSION DEVICE

TECHNICAL FIELD

The present invention relates to an optical transmission device for converting data into an optical signal, transmitting the optical signal, and receiving the transmitted optical signal. More particularly, the present invention relates to an optical transmission device which utilizes a noise component included as a physical property in light to significantly suppress interception/eavesdropping of data by the third party other than authorized receivers, thereby achieving encrypted data communication having a high level of secrecy.

BACKGROUND ART

FIG. 19 is a diagram illustrating a configuration of a conventional optical transmission device 91 supporting encrypted communication. In FIG. 19, the optical transmission device 91 comprises a light source 95, an optical information modulating section 94, an encryption section 93, an optical transmission channel 993, a decoding section 98, and an optical intensity detecting section 97. The light source 95, the optical information modulating section 94, and the encryption section 93 constitute an optical transmitting circuit 92. The decoding section 98 and the optical intensity detecting section 97 constitute an optical receiving circuit 96. Note that, in FIG. 19, in order to describe an operation of the optical transmission device 91, an eavesdropper's optical receiving circuit 99 comprising an eavesdropper's optical intensity detecting section 992 and a decryption section 991 is also illustrated.

An operation of the optical transmission device 91 thus configured will be described with reference to FIG. 19. The encryption section 93 in the optical transmitting circuit 92 and the decoding section 98 in the optical receiving circuit 96 previously share a source code Ki as an "encryption key". The encryption section 93 encrypts an information signal Di to be transmitted, using the source code Ki, and outputs the resultant encrypted signal. The optical information modulating section 94 optically modulates light output from the light source 95 using the encrypted information signal output from the encryption section 93, and outputs the resultant signal to the optical transmission channel 993. The optical intensity detecting section 97 receives the optically modulated signal transmitted through the optical transmission channel 993, detects and converts the intensity-modulated light component into an electrical signal, and outputs the electrical signal. The decoding section 98 decodes the output signal from the optical intensity detecting section 97 using the source code Ki to reproduce the information signal Di.

In conventional optical transmission devices as described above, a predetermined code is shared as a "secret key" between a sender and a receiver. The sender encrypts an information signal by performing a predetermined computation process using the code. After transmission, the receiver decodes the signal by performing substantially a reverse computation process using a similar code, to reproduce the original information signal. Thereby, decoding is not possible for the third party other than authorized receivers having the "secret key", i.e., it is significantly difficult to achieve eavesdropping, thereby making it possible to achieve data communication with a high level of secrecy.

Patent Document 1: Japanese Laid-Open Patent Publication No. 9-205420

DISCLOSURE OF THE INVENTION

Problems to be Solved by the Invention

However, in conventional encrypted communication techniques based on a computation process, there is inherently the risk of decryption being performed mathematically sooner or later as computers will be improved, so that a high level of security cannot be guaranteed for a long term. Specifically, the eavesdropper's optical receiving circuit 99 branches and extracts a portion of an optical signal propagating through the optical transmission channel 993, to input an optical signal having quality which is the same as or substantially similar to that of the authorized receiver's optical receiving circuit 96 to the eavesdropper's optical intensity detecting section 992, in which the optical signal is converted into an electrical signal. The decryption section 991 can recover the original the information signal Di. The decryption section 991 mainly comprises a high-performance computer or the like, and can decrypt an encrypted signal by a computation process without possessing the "secret key" if a signal having sufficient quality is input.

Therefore, an object of the present invention is to provide an optical transmission device which utilizes an unpredictable noise component included as a physical property (natural phenomenon) in light, to achieve encrypted communication which cannot be analyzed or decrypted by a computer process.

Solution to the Problems

To achieve the above objects, the present invention has the following aspects. A first aspect to the present invention is directed to a multimode optical transmission device for transmitting a multimode optical signal modulated using an information signal to be transmitted, comprising an optical transmitting circuit for modulating multimode oscillation light using the information signal, subjecting at least one oscillation-mode light beam of the modulated multimode oscillation light to a predetermined operation, and outputting the result to an optical transmission channel, and an optical receiving circuit for receiving an optical signal transmitted through the optical transmission channel, subjecting the received optical signal to an operation reverse to the predetermined operation to recover an optical signal as it was before being subjected to the predetermined operation, and converting the recovered optical signal into an electrical signal, thereby reproducing the information signal.

According to the first aspect of the present invention, at least one oscillation-mode light beam of multimode oscillation light is subjected to a predetermined operation to change a correlation relationship in optical intensity or optical phase between oscillation-mode light components. Thereby, an unpredictable noise component included as a physical property (natural phenomenon) in light occurs. When eavesdropping is performed, a signal-to-noise ratio of an optical signal received by an eavesdropper's optical receiving circuit is deteriorated due to the unpredictable noise component, so that an optical signal transmitted by the optical transmitting circuit cannot be correctly reproduced. Therefore, by utilizing the unpredictable noise component, an optical transmission device is provided which can achieve high-secrecy encrypted communication which cannot be analyzed or decrypted by computer processes.

In a second aspect of the present invention, the optical transmitting circuit may subject a plurality of oscillation-mode light beams of the multimode oscillation light to an operation corresponding to a predetermined code as the predetermined operation, and output the result to the optical transmission channel. The optical receiving circuit may receive light transmitted through the optical transmission channel, subject the plurality of oscillation-mode light beams of the received light to an operation reverse to the operation corresponding to the predetermined code to recover an optical signal as it was before being subjected to the predetermined operation, detect a change in total optical intensity of the plurality of oscillation-mode light beams, and convert the recovered optical signal into an electrical signal, thereby reproducing the information signal.

According to the second aspect of the present invention, each oscillation-mode light beam of multimode oscillation light is subjected to a predetermined operation to change a correlation relationship in optical intensity or optical phase between oscillation-mode light components. Thereby, an unpredictable noise component included as a physical property (natural phenomenon) in light occurs. An authorized optical receiving circuit and an authorized optical transmitting circuit share a pattern of changes in optical intensity or optical phase between oscillation-mode light components as a "secret key". The optical receiving circuit removes a noise component by performing an operation having a reverse relationship with a predetermined operation performed by the optical transmitting circuit, based on the secret key. Thereby, the optical receiving circuit can reproduce an optical signal having a light spectrum which is similar to an optical signal transmitted by the optical transmitting circuit. When eavesdropping is performed, a signal-to-noise ratio of an optical signal received by an eavesdropper's optical receiving circuit is deteriorated due to the unpredictable noise component, so that an optical signal transmitted by the optical transmitting circuit cannot be correctly reproduced. Therefore, by utilizing the unpredictable noise component, an optical transmission device is provided which can achieve high-secrecy encrypted communication which cannot be analyzed or decrypted by computer processes.

Preferably, the optical transmitting circuit may include a multimode light source for outputting multimode oscillating light, an optical information modulating section for modulating the light output from the multimode light source using an information signal, and outputting the modulated optical signal, and a mode encoding section for receiving the optical signal output from the optical information modulating section, subjecting a plurality of oscillation-mode light beams of the received optical signal to a first operation corresponding to the predetermined code, and outputting the result to the optical transmission channel. The optical receiving circuit may include a mode decoding section for receiving an optical signal transmitted through the optical transmission channel, subjecting a plurality of oscillation-mode light beams of the received optical signal to a second operation having a reverse relationship with the first operation corresponding to the predetermined code, and outputting the result, and an optical intensity detecting section for detecting a change in total optical intensity of an optical signal output from the mode decoding section, and converting the optical signal into an electrical signal, to reproduce the information signal.

Thereby, noise generated by subjecting components constituting light oscillating in a plurality of modes to respective separate operations, is utilized, and unique coding and decoding operations are shared between a sender and a receiver, thereby securing a high level of reception signal quality and significantly suppressing eavesdropping by the third party, resulting in a high-secrecy optical transmission device.

For example, the first operation in the mode encoding section may be an operation of providing a predetermined amount of intensity change corresponding to the predetermined code to each of a plurality of oscillation-mode light beams of an input optical signal. The second operation in the mode decoding section may be an operation of providing an intensity change having a polarity reverse to the predetermined amount of intensity change corresponding to the predetermined code, to each of a plurality of oscillation-mode light beams of an input optical signal.

For example, the first operation in the mode encoding section may be an operation of providing a predetermined amount of phase change corresponding to the predetermined code to each of a plurality of oscillation-mode light beams of an input optical signal. The second operation in the mode decoding section may be an operation of providing a phase change having a polarity reverse to the predetermined amount of phase change corresponding to the predetermined code, to each of a plurality of oscillation-mode light beams of an input optical signal.

For example, the first operation in the mode encoding section may be an operation of providing a predetermined amount of polarization change corresponding to the predetermined code to each of a plurality of oscillation-mode light beams of an input optical signal. The second operation in the mode decoding section may be an operation of providing a polarization change having a polarity reverse to the predetermined amount of polarization change corresponding to the predetermined code, to each of a plurality of oscillation-mode light beams of an input optical signal.

For example, the first operation in the mode encoding section may be an operation of providing a predetermined amount of frequency change corresponding to the predetermined code to each of a plurality of oscillation-mode light beams of an input optical signal. The second operation in the mode decoding section may be an operation of providing a frequency change having a polarity reverse to the predetermined amount of frequency change corresponding to the predetermined code, to each of a plurality of oscillation-mode light beams of an input optical signal.

Thereby, noise generated by subjecting a physical parameter of each of components constituting light oscillating in a plurality of modes to a corresponding separate operation, is utilized, and unique coding and decoding operations are shared between a sender and a receiver, thereby securing a high level of reception signal quality and significantly suppressing eavesdropping by the third party, resulting in a high-secrecy optical transmission device.

Preferably, the multimode light source may comprise a plurality of light sources for outputting light beams having a correlation in optical intensity and optical phase between each other and wavelengths different from each other, an optical mode combining section for combining the light beams output from the plurality of light sources, and outputting the result, and a code generating section for supplying to each of the light sources a modulation signal which causes a total intensity of light output from the optical mode combining section to be constant, and substantially randomly modulates intensities and/or phases of the light beams output from the plurality of light sources.

Preferably, the multimode light source may comprise a plurality of light sources for outputting light beams wavelengths different from each other, an optical mode combining section for combining the light beams output from the plurality of light sources, and outputting the result, an optical phase synchronizing section for synchronizing phase changes of the light beams output from the plurality of light sources, and a code generating section for supplying to each of the light sources a modulation signal which causes a total intensity of light output from the optical mode combining section to be constant, and substantially randomly modulates intensities of the light beams output from the plurality of light sources.

Preferably, the multimode light source may comprise a plurality of light sources for outputting light beams wavelengths different from each other, an optical mode combining section for combining the light beams output from the plurality of light sources, and outputting the result, an optical intensity synchronizing section for synchronizing intensity changes of the light beams output from the plurality of light sources, and a code generating section for supplying to each of the light sources a modulation signal which causes a total intensity of light output from the optical mode combining section to be constant, and substantially randomly modulates phases of the light beams output from the plurality of light sources.

Thus, multimode light beams having a correlation in the optical intensity fluctuation and the optical phase fluctuation between each other are generated, and noise generated by subjecting the optical components to respective separate operations, is utilized, thereby making it possible to achieve a high-secrecy optical transmission device which significant prevent eavesdropping by the third party.

For example, the multimode light source may be an LED (Light Emission Diode), an FP (Fabry-Perot) laser, an RC (Resonant Cabity)-LED, a VCSEL (Vertical Cabity Surface Emitting Laser), or an SLD (Super Luminescent Diode).

Thus, a multimode light source having a correlation in the optical intensity fluctuation and the optical phase fluctuation between each other is used, and noise generated by subjecting the optical components to respective separate operations, is utilized, thereby making it possible to achieve a high-secrecy optical transmission device which significant prevent eavesdropping by the third party.

Preferably, the multimode optical transmission device may have a plurality of pairs of the optical transmitting circuit and the optical receiving circuit. The multimode optical transmission device may comprise an optical combining section for combining optical signal components output from the optical transmitting circuits, and outputting the result to the optical transmission channel, and an optical branching section for branching an optical signal component transmitted through the optical transmission channel, and outputting the result to the corresponding optical receiving circuits. Each pair of the optical transmitting circuit and the optical receiving circuit may subject a plurality of oscillation-mode light beams to a first operation and a second operation corresponding to predetermined codes different from each other.

Thus, noise generated by subjecting components constituting light oscillating in a plurality of modes to respective separate operations, is utilized, thereby making it possible to a high-secrecy optical transmission device which can suppress information leakage or interference between a plurality of sender and receiver pairs.

For example, the optical transmission channel may be an optical fiber, an optical waveguide, or free space.

In a third aspect of the present invention, the optical transmitting circuit may extract predetermined oscillation-mode light from the multimode oscillation light as the predetermined operation, and output the extracted signal to the optical transmission channel. The optical receiving circuit may receive light transmitted through the optical transmission channel, combine the light and light which is the same as or similar to the extracted predetermined oscillation-mode light, and thereafter, subject the result to squared detection to reproduce the information signal.

According to the third aspect of the present invention, light obtained by removing predetermined oscillation-mode light from multimode oscillation light is transmitted, and the light excluding the predetermined oscillation-mode light is detected, so that light which is the same as or similar to the predetermined oscillation-mode light is required. Therefore, when the light excluding the predetermined oscillation-mode light is received by the third party trying eavesdropping, noise (mode partition noise) occurs during removal of the predetermined oscillation-mode light from the multimode oscillation light, so that a signal-to-noise power ratio is significantly deteriorated, and therefore, the third party cannot correctly perform detection. Thus, in the present invention, noise (mode partition noise) occurring when predetermined oscillation-mode light is removed from multimode oscillation light, is utilized, thereby making it possible to provide a high-secrecy optical transmission device which significantly prevents eavesdropping by the third party.

Preferably, the optical transmitting circuit may include a multimode light source for outputting multimode oscillating light, an optical information modulating section for modulating the light output from the multimode light source using the information signal, and outputting the modulated optical signal, and an optical separating section for receiving the optical signal output from the optical information modulating section, separating the predetermined oscillation-mode light from a plurality of oscillation-mode light beams of the received optical signal, and outputting the predetermined oscillation-mode light to a subsidiary optical transmission channel and a remaining optical signal component other than the predetermined oscillation-mode light of the optical signal to a main optical transmission channel. The optical receiving circuit may include an optical intensity detecting section for combining the optical signal component transmitted through the main optical transmission channel and the predetermined oscillation-mode light transmitted through the subsidiary optical transmission channel, and subjecting the result to squared detection to reproduce the information signal.

Preferably, the optical transmitting circuit may include a multimode light source for outputting multimode oscillating light, an optical information modulating section for modulating the light output from the multimode light source using the information signal, and outputting the modulated optical signal, and an optical separating section for receiving the optical signal output from the optical information modulating section, separating the predetermined oscillation-mode light from a plurality of oscillation-mode light beams of the received optical signal, and outputting the predetermined oscillation-mode light to a subsidiary optical transmission channel and a remaining optical signal component other than the predetermined oscillation-mode light of the optical signal to a main optical transmission channel. The optical receiving circuit may include a local light generating section for receiving the predetermined oscillation-mode light transmitted through the subsidiary optical transmission channel, and generating local oscillation light having the same physical property as that of the predetermined oscillation-mode light, and an optical intensity detecting section for combining the optical signal component transmitted through the main optical transmission channel and the local oscillation light output from the local light generating section, and subjecting the result to squared detection to reproduce the information signal.

Preferably, the optical transmitting circuit may include a multimode light source for outputting multimode oscillating light, an optical information modulating section for modulating the light output from the multimode light source using the information signal, and outputting the modulated optical signal, an optical separating section for receiving the optical signal output from the optical information modulating section, separating the predetermined oscillation-mode light from a plurality of oscillation-mode light beams of the received optical signal, and outputting a remaining optical signal component other than the predetermined oscillation-mode light of the optical signal to an optical transmission channel, and an optical detecting section for receiving the predetermined oscillation-mode light separated by the optical separating section, detecting a physical property of the received predetermined oscillation-mode light, and outputting a detected signal to a transmission channel. The optical receiving circuit may include a local light generating section for generating local oscillation light having the same physical property as that of the predetermined oscillation-mode light, based on the detected signal transmitted through the transmission channel, and an optical intensity detecting section for combining the optical signal component transmitted through the optical transmission channel and the local oscillation light output from the local light generating section, and subjecting the result to squared detection to reproduce the information signal.

Thus, noise occurring when predetermined oscillation-mode light is removed from multimode oscillation light, is utilized, and an authorized receiver shares the oscillation-mode light, thereby making it possible to achieve a high-secrecy optical transmission device which secures a high level of reception signal quality and significantly prevent eavesdropping by the third party.

Preferably, the optical transmission device may further comprise a plurality of pairs of the optical transmitting circuit and the optical receiving circuit, a main optical combining section for combining optical signal components other than the predetermined oscillation-mode light output from the optical transmitting circuits, and outputting the result to the main optical transmission channel, and a main optical branching section for branching the optical signal component other than the predetermined oscillation-mode light transmitted through the main optical transmission channel, and outputting the result to the corresponding optical receiving circuits.

Preferably, the optical transmission device may further comprise a plurality of pairs of the optical transmitting circuit and the optical receiving circuit, a subsidiary optical combining section for combining the predetermined oscillation-mode light beams output from the optical transmitting circuits, and outputting the result to the subsidiary optical transmission channel, and a subsidiary optical branching section for branching the predetermined oscillation-mode light transmitted through the subsidiary optical transmission channel, and outputting the result to the corresponding optical receiving circuits.

Preferably, the optical transmission device may further comprise a plurality of pairs of the optical transmitting circuit and the optical receiving circuit, a main optical combining section for combining optical signal components other than the predetermined oscillation-mode light beams output from the optical transmitting circuits, and outputting the result to the main optical transmission channel, a main optical branching section for branching the optical signal component other than the predetermined oscillation-mode light transmitted through the main optical transmission channel, and outputting the result to the corresponding optical receiving circuits, a subsidiary optical combining section for combining the predetermined oscillation-mode light beams output from the optical transmitting circuits, and outputting the result to the subsidiary optical transmission channel, and a subsidiary optical branching section for branching the predetermined oscillation-mode light transmitted through the subsidiary optical transmission channel, and outputting the result to the corresponding optical receiving circuits.

Preferably, the optical transmission device may further comprise a plurality of pairs of the optical transmitting circuit and the optical receiving circuit, a combining section for combining detected signals output from the optical transmitting circuits, and outputting the result to the transmission channel, and a branching section for branching the detected signal transmitted through the transmission channel, and outputting the result to the corresponding optical receiving circuits.

Thus, noise occurring when predetermined oscillation-mode light is removed from multimode oscillation light, is utilized, thereby making it possible to a high-secrecy optical transmission device which can prevent information leakage or interference between a plurality of sender and receiver pairs.

Preferably, the optical signal components other than the predetermined oscillation-mode light beams transmitted and received by the plurality of pairs of the optical transmitting circuit and the optical receiving circuit may have wavelengths different from each other.

Preferably, the predetermined oscillation-mode light beams transmitted and received by the plurality of pairs of the optical transmitting circuit and the optical receiving circuit may have wavelengths different from each other.

Preferably, the optical signal components other than the predetermined oscillation-mode light beams transmitted and received by the plurality of pairs of the optical transmitting circuit and the optical receiving circuit may have the same wavelength, and the predetermined oscillation-mode light beams transmitted and received by the plurality of pairs of the optical transmitting circuit and the optical receiving circuit may have wavelengths different from each other.

Thus, noise occurring when predetermined oscillation-mode light is removed from multimode oscillation light, is utilized, thereby making it possible to a high-secrecy optical transmission device in which a simple optical transmission channel is provided while preventing information leakage or interference between a plurality of sender and receiver pairs.

For example, the multimode light source may comprise a plurality of light sources for outputting light beams having a correlation in optical intensity and optical phase between each other and wavelengths different from each other, an optical mode combining section for combining the light beams output from the plurality of light sources, and outputting the result, and a code generating section for supplying to each of the light sources a modulation signal which causes a total intensity of light output from the optical mode combining section to be constant, and substantially randomly modulates intensities and/or phases of the light beams output from the plurality of light sources.

For example, the multimode light source may comprise a plurality of light sources for outputting light beams wavelengths different from each other, an optical mode combining section for combining the light beams output from the plurality of light sources, and outputting the result, an optical phase synchronizing section for synchronizing phase changes of the light beams output from the plurality of light sources, and a code generating section for supplying to each of the light sources a modulation signal which causes a total intensity of light output from the optical mode combining section to be constant, and substantially randomly modulates intensities of the light beams output from the plurality of light sources.

For example, the multimode light source may comprise a plurality of light sources for outputting light beams wavelengths different from each other, an optical mode combining section for combining the light beams output from the plurality of light sources, and outputting the result, an optical intensity synchronizing section for synchronizing intensity changes of the light beams output from the plurality of light sources, and a code generating section for supplying to each of the light sources a modulation signal which causes a total intensity of light output from the optical mode combining section to be constant, and substantially randomly modulates phases of the light beams output from the plurality of light sources.

Thus, multimode light beams having a correlation in the optical intensity fluctuation and the optical phase fluctuation between each other are generated, and noise occurring when the predetermined oscillation-mode light is removed, is utilized, thereby making it possible to achieve a high-secrecy optical transmission device which significant prevent eavesdropping by the third party.

For example, the multimode light source may be an LED (Light Emission Diode), an FP (Fabry-Perot) laser, an RC (Resonant Cabity)-LED, a VCSEL (Vertical Cabity Surface Emitting Laser), or an SLD (Super Luminescent Diode).

Thus, a multimode light source having a correlation in the optical intensity fluctuation and the optical phase fluctuation between each other is used, and noise occurring when the predetermined oscillation-mode light is removed, is utilized, thereby making it possible to achieve a high-secrecy optical transmission device which significant prevent eavesdropping by the third party.

EFFECT OF THE INVENTION

As described above, according to the present invention, at least one oscillation-mode light beam of multimode oscillation light is subjected to a predetermined operation to change a correlation relationship in optical intensity or optical phase between oscillation-mode light components. Thereby, an unpredictable noise component included as a physical property (natural phenomenon) in light occurs. When eavesdropping is performed, a signal-to-noise ratio of an optical signal received by an eavesdropper's optical receiving circuit is deteriorated due to the unpredictable noise component, so that an optical signal transmitted by the optical transmitting circuit cannot be correctly reproduced. Therefore, by utilizing the unpredictable noise component, an optical transmission device is provided which can achieve high-secrecy encrypted communication which cannot be analyzed or decrypted by computer processes.

Note that the terms "device" and "circuit" as used herein may mean a system or the like irrespective of the magnitude of the scale.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram illustrating a configuration of an optical transmission device 100 supporting encrypted communication according to a first embodiment of the present invention.

Figure 1:
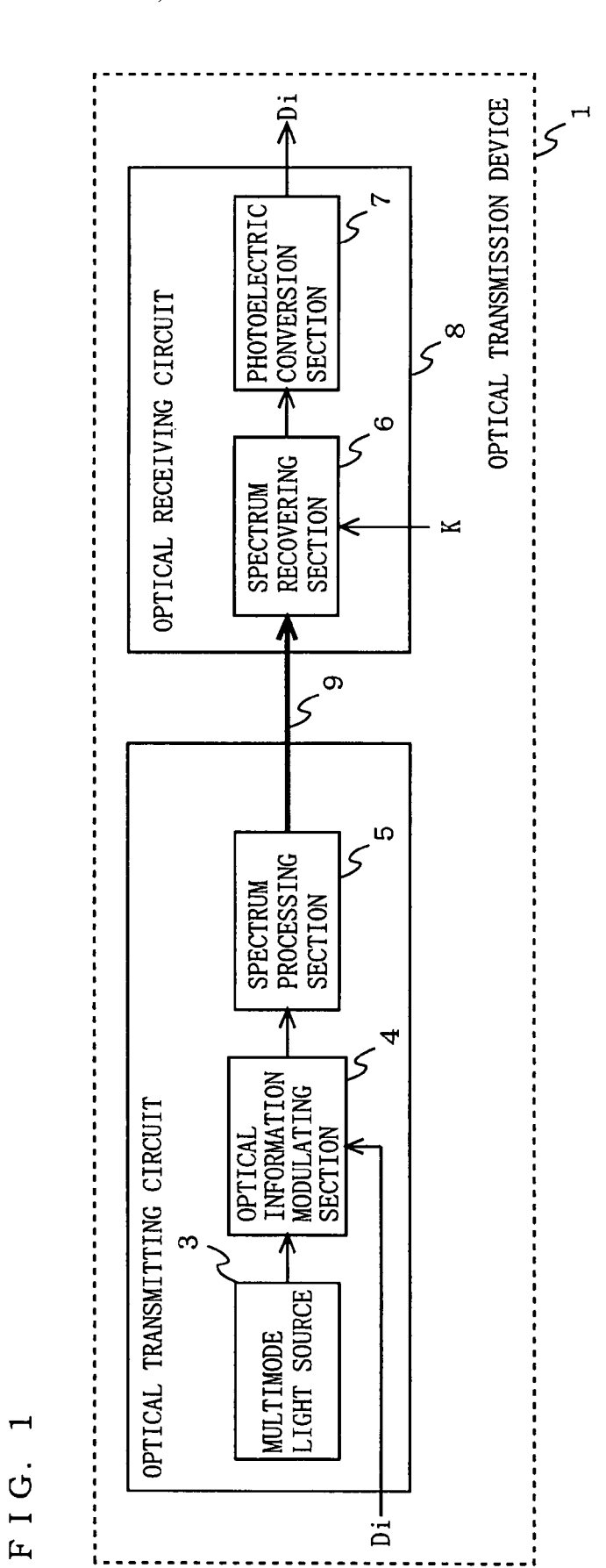
FIG. 1 is a functional block diagram illustrating a conceptual configuration of an optical transmission device 1 according to an embodiment of the present invention.

DESCRIPTION OF THE REFERENCE CHARACTERS 1, 100, 100a, 100b, 200, 200a, 500, 700, 800, 800a, 800b, 800c optical transmission device
3, 101, 101a, 101b, 201, 201a, 201b multimode light source
4, 102, 202 optical information modulating section
5 spectrum processing section
6 spectrum recovering section
7 photoelectric conversion section
103 mode encoding section
9, 104 optical transmission channel
105 mode decoding section
106 optical intensity detecting section
1052 eavesdropper's mode decoding section
1062, 2062 eavesdropper's optical intensity detecting section
2, 1001, 1001a, 1001b, 2001, 2001a, 2001b, 8001 optical transmitting circuit
8, 1002, 2002, 7002, 8002 optical receiving circuit
1003, 2003 eavesdropper's optical receiving circuit
4011 first light source
4012 second light source
4013 third light source
402 optical mode combining section
403 code generating section
5001, 6001 first code generating section
5002, 6002 second code generating section
5011, 6011 first optical phase modulating section
5012, 6012 second optical phase modulating section
5013, 6013 third optical phase modulating section
609 optical combining section
610 optical branching section
203 optical separating section
204 main optical transmission channel
205 subsidiary optical transmission channel
206 optical intensity detecting section
507 code generating section
705 subsidiary transmission channel
707 local light generating section
708 optical detecting section
709 main optical combining section
710 main optical branching section
809 subsidiary optical combining section
810 subsidiary optical branching section

BEST MODE FOR CARRYING OUT THE INVENTION

FIG. 1 is a functional block diagram illustrating a conceptual configuration of an optical transmission device 1 according to an embodiment of the present invention. In FIG. 1, the optical transmission device 1 comprises an optical transmitting circuit 2 and an optical receiving circuit 8. The optical transmitting circuit 2 includes a multimode light source 3, an optical information modulating section 4, and a spectrum processing section 5. The optical receiving circuit 8 includes a spectrum recovering section 6 and a photoelectric conversion section 7.

The multimode light source 3 outputs multimode oscillation light. The optical information modulating section 4 modulates the multimode oscillation light output from the multimode light source 3 using an information signal Di to be transmitted, and outputs the resultant signal as an optical signal. The spectrum processing section 5 subjects the optical signal output from the optical information modulating section 4 to a predetermined operation based on key information Ki input with respect to at least one oscillation-mode light beam of the multimode oscillation light, and outputs the resultant signal to an optical transmission channel 9. As the predetermined operation, various spectrum processes disclosed in embodiments below may be considered.

The spectrum recovering section 6 receives the optical signal transmitted through the optical transmission channel 9, and subjects the optical signal to an operation reverse to the predetermined operation of the optical transmitting circuit based on the input key information Ki, to recover the optical signal as it was before being subjected to the predetermined operation. As the reverse operation in the spectrum recovering section 6, various spectrum processes disclosed in embodiments below may be considered. The photoelectric conversion section 7 converts the optical signal recovered by the spectrum recovering section 6 to an electrical signal, to reproduce the information signal Di.

Hereinafter, embodiments for implementing the optical transmission device 1 of FIG. 1 will be specifically described with reference to the accompanying drawings.

First Embodiment

FIG. 2 is a diagram illustrating a configuration of an optical transmission device 100 supporting encrypted communication according to a first embodiment of the present invention. FIGS. 3A to 3E are schematic diagrams illustrating exemplary spectra of light (optical signals) in major parts of the optical transmission device 100. FIGS. 4A to 4E are schematic diagrams illustrating exemplary spectra of light (optical signals) in major parts of the optical transmission device 100 or an eavesdropper's optical receiving circuit 1003.

In FIG. 2, the optical transmission device 100 of this embodiment comprises a multimode light source 101, an optical information modulating section 102, a mode encoding section 103, an optical transmission channel 104, a mode decoding section 105, and an optical intensity detecting section 106. The multimode light source 101, the optical information modulating section 102, and the mode encoding section 103 constitute an optical transmitting circuit 1001. The mode decoding section 105 and the optical intensity detecting section 106 constitute an optical receiving circuit 1002. Note that, in order to describe an operation of this embodiment, FIG. 2 also illustrates the eavesdropper's optical receiving circuit 1003 comprising an eavesdropper's mode decoding section 1052 and an eavesdropper's optical intensity detecting section 1062. Note that the optical transmission channel 104 for connecting the optical transmitting circuit 1001 and the optical receiving circuit 1002 may be an optical fiber, an optical waveguide, or free space.

Figure 3A:
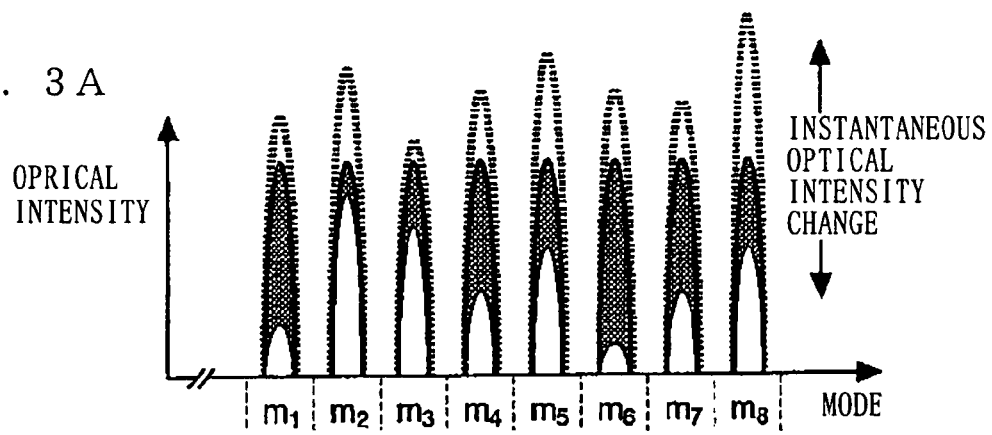
FIG. 3A is a schematic diagram illustrating exemplary spectra of light (optical signals) in major parts of the optical transmission device 100.

Next, an operation of this embodiment of FIG. 2 will be described. In the optical transmitting circuit 1001, the multimode light source 101 comprises a light source which oscillates in a plurality of modes (in FIG. 3A, eight wavelengths m1 to m8 are assumed to constitute the modes) as illustrated in FIG. 3A, and outputs light having the modes. Specific examples of such a multimode oscillation light source include an LED (Light Emission Diode), an FP (Fabry-Perot) laser, an RC (Resonant Cabity)-LED, a VCSEL (Vertical Cabity Surface Emitting Laser), an SLD (Super Luminescent Diode), and a surface emitting laser. Regarding each oscillation-mode light beam in output light spectra of these light sources, parameters, such as an optical intensity, an optical phase and the like, fluctuate at a high rate. In these light sources, although an optical intensity fluctuation component and an optical phase fluctuation component of each oscillation-mode light beam are correlated with optical intensity fluctuation components and optical phase fluctuation components of other oscillation-mode light beams, a total optical intensity of light output from the multimode light source 101 has a property of indicating substantially a constant value.

The optical information modulating section 102 modulates the light output from the multimode light source 101 using an information signal Di to be transmitted, and outputs the resultant signal as an optical signal.

Figure 3B:
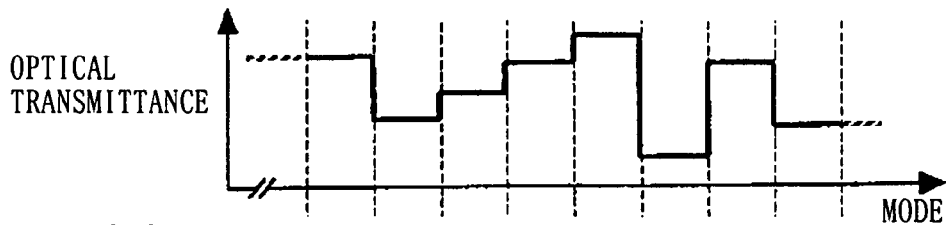
FIG. 3B is a schematic diagram illustrating exemplary spectra of light (optical signals) in the major parts of the optical transmission device 100.
Figure 3C:
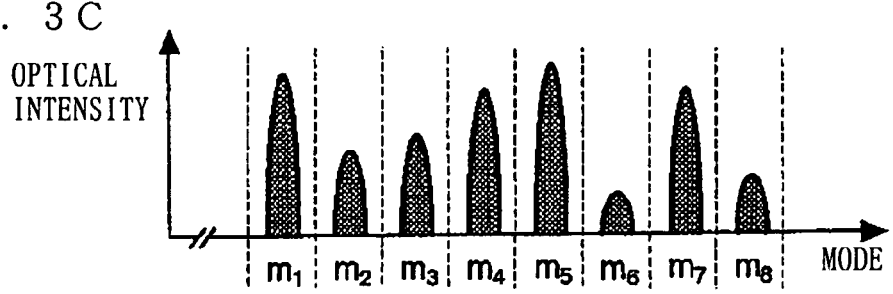
FIG. 3C is a schematic diagram illustrating exemplary spectra of light (optical signals) in the major parts of the optical transmission device 100.

The mode encoding section 103 receives the optical signal output from the optical information modulating section 102, subjects each of the oscillation-mode light beams to a uniquely corresponding predetermined encoding operation (spectrum process) based on a predetermined source code Ki which is shared between the mode encoding section 103 and the mode decoding section 105 of the optical receiving circuit 1002, and outputs the resultant signal to the optical transmission channel 104. In other words, the mode encoding section 103 outputs light obtained by subjecting the oscillation-mode light beams to the predetermined operations supporting the predetermined code (first operation). Specifically, for example, as illustrated in FIG. 3B, the mode encoding section 103 previously defines a predetermined pattern of optical intensity transmittances which is determined, depending on the source code Ki, for the respective oscillation-mode light beams. As the first operation, the mode encoding section 103 subjects each of the oscillation-mode light beams to an operation of providing a predetermined amount of change in intensity, and outputs light obtained by the first operation to the optical transmission channel 104. Thereby, an unpredictable noise component (mode partition noise) possessed as a physical property (natural phenomenon) by light is generated, i.e., the mode encoding section 103 generates and outputs an optical signal (FIG. 3C) having a light spectrum different from that of the input optical signal (FIG. 3A).

Figure 3D:
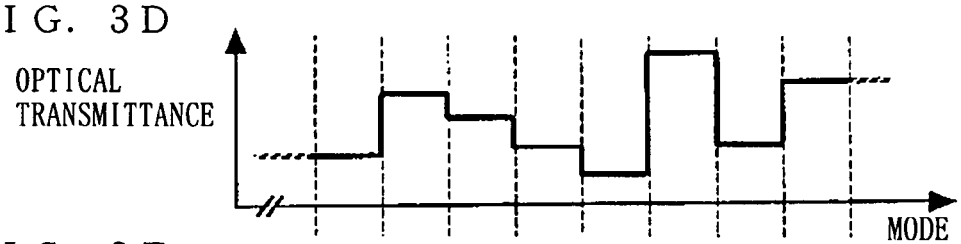
FIG. 3D is a schematic diagram illustrating exemplary spectra of light (optical signals) in the major parts of the optical transmission device 100.
Figure 3E:
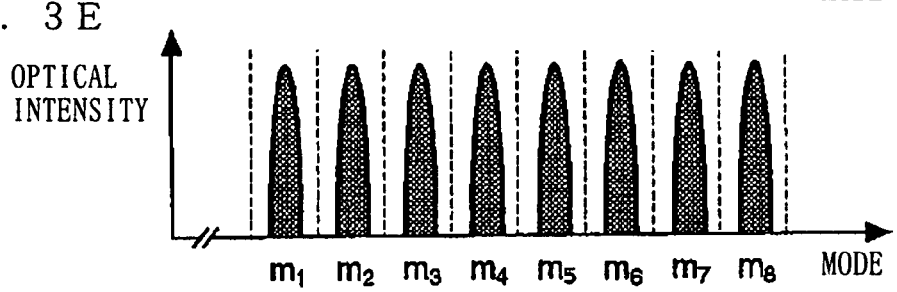
FIG. 3E is a schematic diagram illustrating exemplary spectra of light (optical signals) in the major parts of the optical transmission device 100.

In the optical receiving circuit 1002, the mode decoding section 105 receives an optical signal transmitted through the optical transmission channel 104, subjects each of the oscillation-mode light beams to a uniquely corresponding decoding operation which has a reverse relationship (complementary relationship) with the above-described predetermined encoding operation, based on the predetermined source code Ki previously shared between the mode decoding section 105 and the mode encoding section 103 of the optical transmitting circuit 1001, and outputs the resultant signal. In other words, the mode decoding section 105 outputs light obtained by subjecting the oscillation-mode light beams to a second operation which is reverse to the predetermined operation (first operation) supporting the predetermined code. Specifically, for example, as illustrated in FIG. 3D, the mode decoding section 105 previously defines a reverse pattern of optical intensity transmittances which has a reverse relationship (complementary relationship) with the predetermined pattern of FIG. 3B for the oscillation-mode light beams, based on the source code Ki. The mode decoding section 105 subjects each of the oscillation-mode light beams to an operation (second operation) of providing an intensity change which has a polarity reverse to the above-described predetermined amount of intensity change, and outputs light obtained by the second operation to the optical intensity detecting section 106. Thereby, the above-described mode partition noise is removed, so that the mode decoding section 105 converts the optical signal (FIG. 3C) transmitted through the optical transmission channel 104 into an optical signal (FIG. 3E) having a light spectrum similar to that of the optical signal (FIG. 3A) output from the optical information modulating section 102, and outputs the converted signal.

The optical intensity detecting section 106 squared-detects the optical signal output from the mode decoding section 105, and detects a change in total optical intensity to detect a modulation component, thereby reproducing the original information signal Di.

Figure 4A:
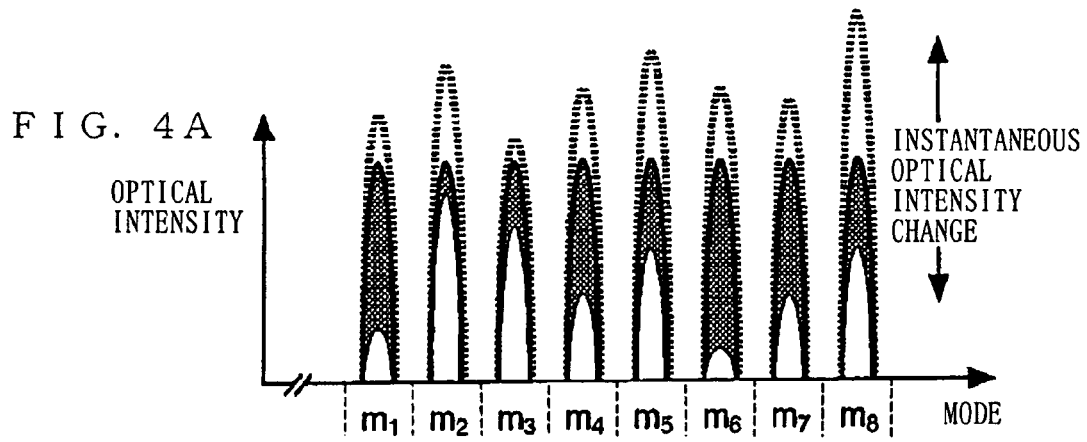
FIG. 4A is a schematic diagram illustrating exemplary spectra of light (optical signals) in major parts of the optical transmission device 100 or an eavesdropper's optical receiving circuit.
Figure 4B:
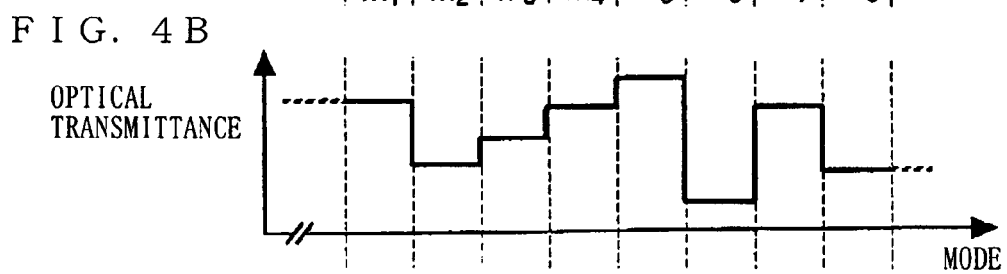
FIG. 4B is a schematic diagram illustrating exemplary spectra of light (optical signals) in the major parts of the optical transmission device 100 or the eavesdropper's optical receiving circuit.
Figure 4C:
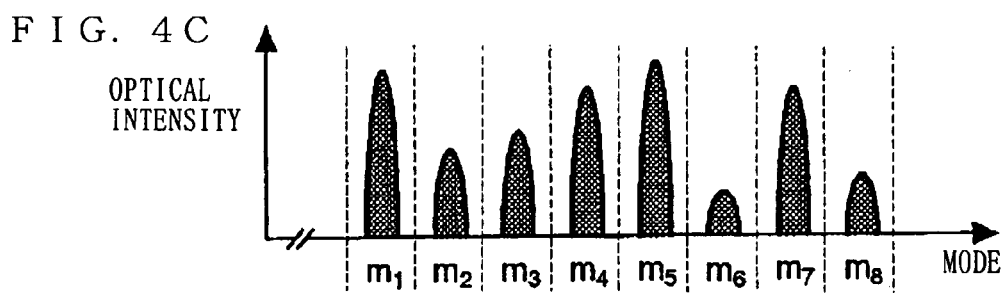
FIG. 4C is a schematic diagram illustrating exemplary spectra of light (optical signals) in the major parts of the optical transmission device 100 or the eavesdropper's optical receiving circuit.
Figure 4D:
FIG. 4D is a schematic diagram illustrating exemplary spectra of light (optical signals) in the major parts of the optical transmission device 100 or the eavesdropper's optical receiving circuit.
Figure 4E:
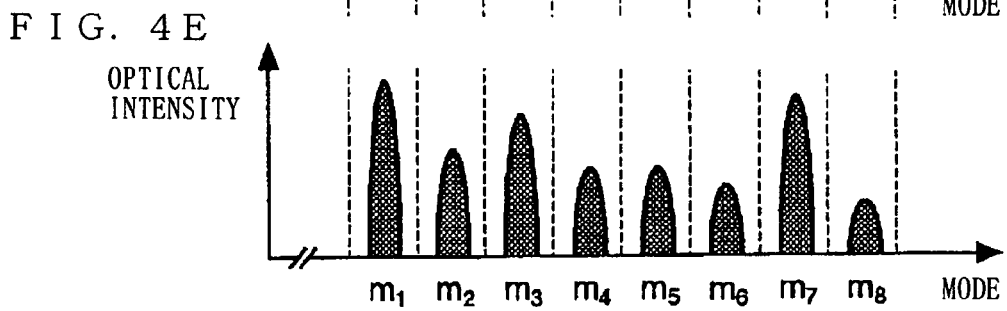
FIG. 4E is a schematic diagram illustrating exemplary spectra of light (optical signals) in the major parts of the optical transmission device 100 or the eavesdropper's optical receiving circuit.

Next, the case where eavesdropping is performed by the third party (the eavesdropper's optical receiving circuit 1003) in this embodiment will be described with reference to FIGS. 4A to 4E. FIG. 4A illustrates a light spectrum of an optical signal output from the optical information modulating section 102, which is similar to FIG. 3A. FIG. 4B illustrates a predetermined pattern of optical intensity transmittances in the mode encoding section 103, which is similar to FIG. 3B. FIG. 4C illustrates a light spectrum of an optical signal output from the mode encoding section 103, which is similar to FIG. 3C. FIG. 4D illustrates an optical intensity transmittance in the eavesdropper's mode decoding section 1052. FIG. 4E illustrates a light spectrum of an optical signal output from the eavesdropper's mode decoding section 1052.

When eavesdropping is performed, the eavesdropper's optical receiving circuit 1003 extracts a portion of an optical signal propagating through the optical transmission channel 104, and inputs the extracted signal to the eavesdropper's mode decoding section 1052. The eavesdropper's mode decoding section 1052 does not share the source code Ki with the mode encoding section 103, and therefore, subjects each oscillation-mode light beam of the input optical signal to a corresponding unique predetermined operation, based on a code Kj different from the source code Ki, and outputs the result. Specifically, for example, as illustrated in FIG. 4D, the eavesdropper's mode decoding section 1052 provides a pattern of optical intensity transmittances different from the optical intensity transmittances which the mode decoding section 105 provides to the respective oscillation-mode light beams (FIG. 3D), and outputs the resultant optical signal. As illustrated in FIG. 4E, the optical signal has a light spectrum different from that (FIG. 4A) of the optical signal output from the optical information modulating section 102. Therefore, the optical signal output from the eavesdropper's mode decoding section 1052 has a changed coherence and contains excessive noise. Therefore, the eavesdropper's optical intensity detecting section 1062 cannot reproduce the information signal Di. Thus, in the eavesdropper's optical receiving circuit 1003, reception signal quality (SNR: signal-to-noise ratio) is deteriorated as compared to authorized receivers (the optical receiving circuit 1002), so that the optical transmission device 100 can secure a high level of secrecy.

Although it has been described in this embodiment that the multimode light source 101 outputs light oscillating in eight modes, and the mode encoding section 103 provides a predetermined pattern of optical intensity transmittances to the eight oscillation-mode light beams, the number of modes may be any plural number other than eight. In this case, the multimode light source 101 may oscillate in a plurality of modes, the number of which is any number other than eight. Also, the mode encoding section 103 may have a predetermined pattern of optical intensity transmittances which correspond to the number of modes in which the multimode light source 101 oscillates.

Although it has been described in this embodiment that the mode encoding section 103 and the mode decoding section 105 provide a predetermined pattern of optical intensity transmittances to respective oscillation-mode light beams, a predetermined pattern of optical phase fluctuations may be provided, which can provide substantially a similar effect. In this case, specifically, the mode encoding section 103 subjects each of a plurality of oscillation-mode light beams of an input optical signal to changing of the phase by a predetermined amount corresponding to a predetermined code (first operation). The mode decoding section 105 subjects each of a plurality of oscillation-mode light beams of an input optical signal to changing of the phase by an amount having a polarity reverse to that of the predetermined amount corresponding to the predetermined code (second operation).

Alternatively, the mode encoding section 103 and the mode decoding section 105 may provide a predetermined pattern of polarization changes to oscillation-mode light beams, thereby obtaining substantially a similar effect. In this case, specifically, the mode encoding section 103 subjects each of a plurality of oscillation-mode light beams of an input optical signal to changing of the polarization by a predetermined amount corresponding to a predetermined code (first operation). The mode decoding section 105 subjects each of a plurality of oscillation-mode light beams of an input optical signal to changing of the polarization by an amount having a polarity reverse to that of the predetermined amount corresponding to the predetermined code (second operation).

Alternatively, the mode encoding section 103 and the mode decoding section 105 may provide a predetermined pattern of frequency changes to oscillation-mode light beams, thereby obtaining substantially a similar effect. In this case, specifically, the mode encoding section 103 subjects each of a plurality of oscillation-mode light beams of an input optical signal to changing of the frequency by a predetermined amount corresponding to a predetermined code (first operation). The mode decoding section 105 subjects each of a plurality of oscillation-mode light beams of an input optical signal to changing of the frequency by an amount having a polarity reverse to that of the predetermined amount corresponding to the predetermined code (second operation).

Alternatively, the mode encoding section 103 and the mode decoding section 105 may provide a predetermined pattern of delay times to oscillation-mode light beams, thereby obtaining substantially a similar effect. In this case, specifically, the mode encoding section 103 provides a predetermined amount of delay time corresponding to a predetermined code to each of a plurality of oscillation-mode light beams of an input optical signal (first operation). The mode decoding section 105 provides a delay time having a polarity reverse to the predetermined amount of delay time corresponding to the predetermined code to each of a plurality of oscillation-mode light beams of an input optical signal (second operation).

(First Variation)

Figure 5:
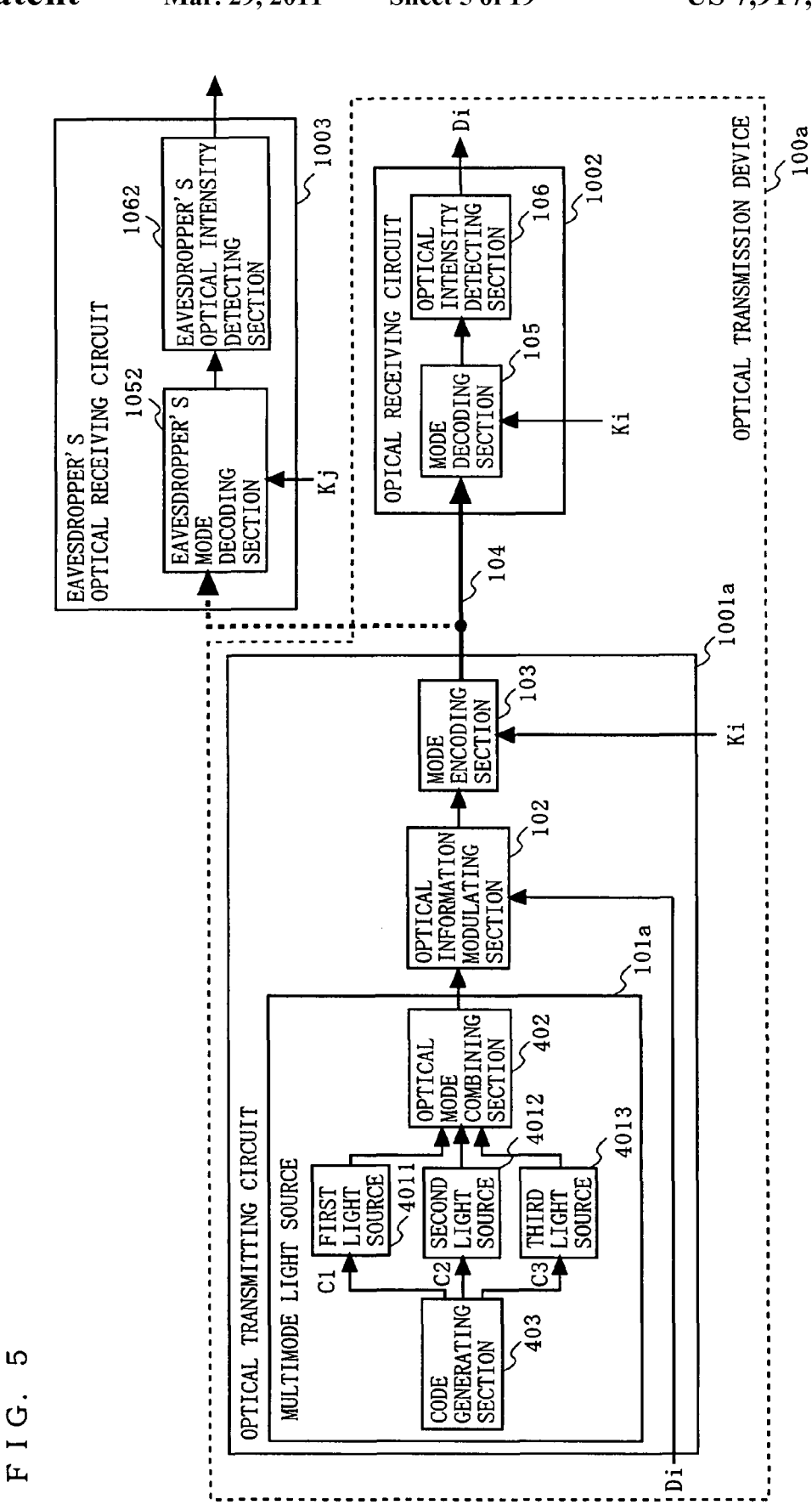
FIG. 5 is a diagram illustrating a configuration of a first variation of the first embodiment.

Next, a first variation of the first embodiment will be described. FIG. 5 is a diagram illustrating a configuration of the first variation of the first embodiment. In FIG. 5, an optical transmitting circuit 1001*a* of an optical transmission device 100*a* is obtained by replacing the multimode light source 101 of the optical transmitting circuit 1001 of FIG. 1 with a multimode light source 101*a*.

The multimode light source 101*a* includes a first light source 4011, a second light source 4012, a third light source 4013, an optical mode combining section 402, and a code generating section 403. In this configuration, the first to third light sources 4011 to 4013 oscillate and output single-mode light beams whose wavelengths are different from each other and whose phases are synchronized in a predetermined relationship. The optical mode combining section 402 combines the output light beams from the first to third light sources 4011 to 4013, and outputs the result. The code generating section 403 generates substantially randomly varying predetermined code sequences C1 to C3 corresponding to the first to third light sources 4011 to 4013, as modulation signals, so that optical intensities of the first to third light sources 4011 to 4013 are substantially randomly modulated in such a manner that a constant total optical intensity is output from the optical mode combining section 402. Thereby, the multimode light source 101*a* can artificially generate multimode light whose optical fluctuation components have a predetermined synchronous relationship with each other, and output light similar to light output from the multimode light source 101 of FIG. 2.

Although it has been described in the first variation that a plurality of single-mode light beams whose phases are synchronized are generated, and optical intensities thereof are separately modulated, optical intensity fluctuations may be synchronized or optical intensities may be stabilized into a constant value, and substantially random optical phase modulation may be separately performed, which can provide substantially a similar effect. In this case, specifically, as the first to third light sources 4011 to 4013, light sources are used which oscillate and output phase-modulated single-mode light beams whose wavelengths are different each other and whose optical intensities are synchronized in a predetermined relationship. The code generating section 403 generates substantially randomly varying predetermined code sequences C1 to C3 corresponding to the first to third light sources 4011 to 4013, as modulation signals, so that optical phases of the first to third light sources 4011 to 4013 are substantially randomly modulated in such a manner that a constant total optical intensity is output from the optical mode combining section 402. Thereby, it is possible to artificially generate multimode light whose optical fluctuation components have a predetermined synchronous relationship with each other, and output light similar to light output from the multimode light source 101 of FIG. 1.

Although it has been described in the first variation that three light sources are used, two or four or more light sources may be used. Also in this case, the code generating section 403 generates substantially randomly varying predetermined code sequences corresponding to the respective light sources so that optical intensities of the light sources are substantially randomly modulated in such a manner that a constant total optical intensity is output from the optical mode combining section 402. Thereby, it is possible to artificially generate multimode light whose optical fluctuation components have a predetermined synchronous relationship with each other, and generate noise similar to the partition noise when any single-mode light beam is missing.

(Second Variation)

Figure 6:
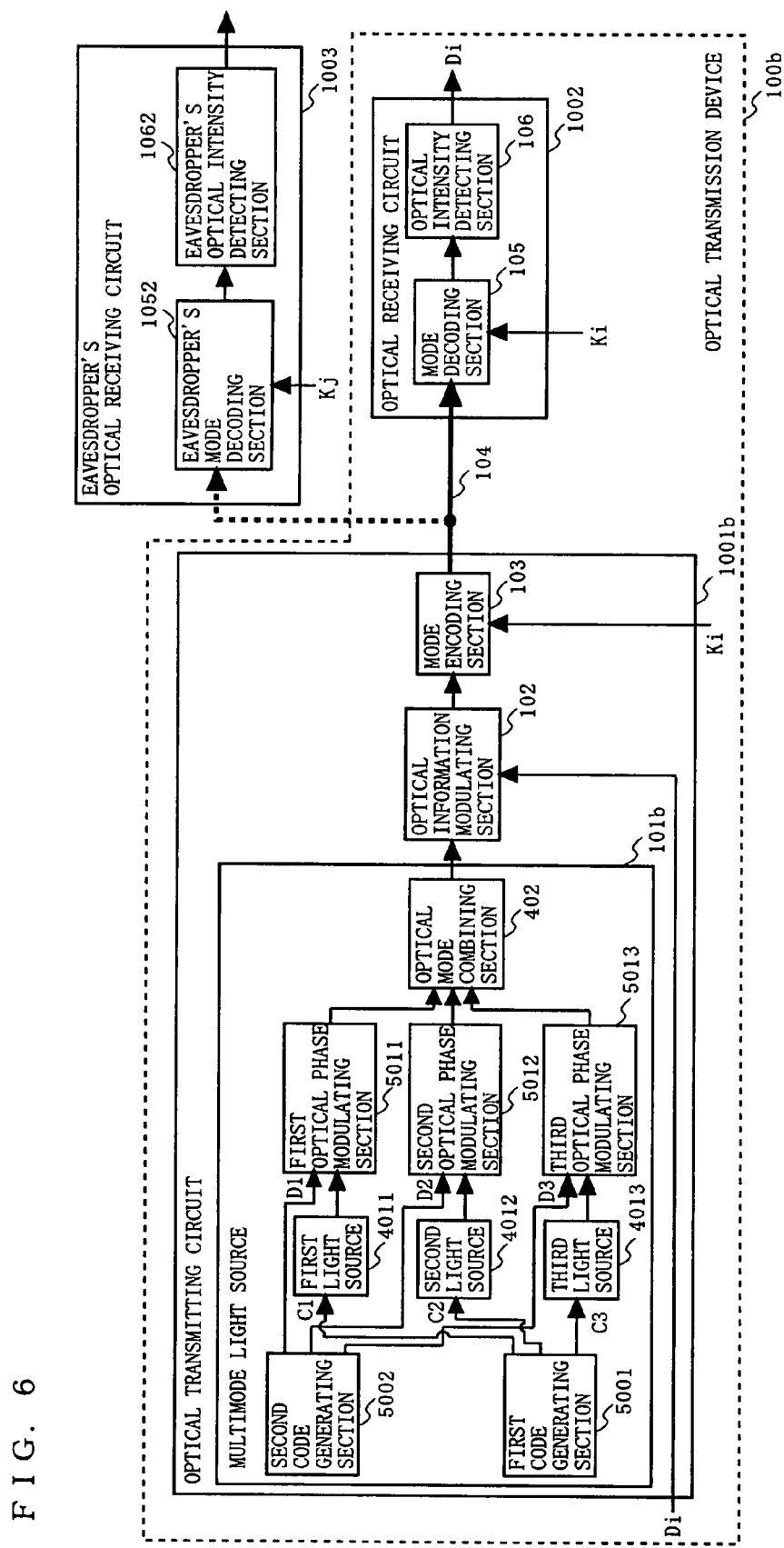
FIG. 6 is a diagram illustrating a configuration of a second variation of the first embodiment.

Next, a second variation of the first embodiment will be described. FIG. 6 is a diagram illustrating a configuration of the second variation of the first embodiment. In FIG. 6, an optical transmitting circuit 1001b of an optical transmission device 100b is obtained by replacing the multimode light source 101 of the optical transmitting circuit 1001 of FIG. 2 with a multimode light source 101b.

The multimode light source 101b includes a first light source 4011, a second light source 4012, a third light source 4013, an optical mode combining section 402, a first code generating section 5001, a second code generating section 5002, a first optical phase modulating section 5011, a second optical phase modulating section 5012, and a third optical phase modulating section 5013. In this configuration, the first to third light sources 4011 to 4013 oscillate and output single-mode light beams having wavelengths different from each other. The first to third optical phase modulating sections 5011 to 5013 are provided, corresponding to the first to third light sources 4011 to 4013, modulate phases of output light beams from the first to third light sources 4011 to 4013, and output the result. The optical mode combining section 402 combines the optical signals output from the first to third optical phase modulating sections 5011 to 5013, and outputs the result. The first code generating section 5001 generates substantially randomly varying predetermined code sequences C1 to C3 corresponding to the first to third light sources 4011 to 4013, as modulation signals, so that output optical intensities of the first to third light sources 4011 to 4013 are substantially randomly modulated based on the code sequences. The second code generating section 5002 generates substantially randomly varying predetermined code sequences D1 to D3 corresponding to the first to third optical phase modulating sections 5011 to 5013 so that the phases of output light beams from the first to third optical phase modulating sections 5011 to 5013 are modulated based on the code sequences in such a manner that the phase changes are synchronized and a constant total optical intensity is output from the optical mode combining section 402. The first to third optical phase modulating sections 5011 to 5013 and the second code generating section 5002 are considered as an optical phase synchronizing section for synchronizing the phase changes of light beams output from the first to third light sources 4011 to 4013. Also, the first code generating section 5001 is considered as a code generating section for causing the total intensity of light output from the optical mode combining section 402 to be constant, and supplying to each light source a code which is a modulation signal for substantially randomly modulating the intensities of light beams to be output from the first to third light sources 4011 to 4013. Thus, in the second variation, it is possible to artificially generate multimode light whose optical fluctuations have a predetermined synchronous relationship with each other, and output light similar to light output from the multimode light source 101 of FIG. 2.

Although it has been described in this embodiment that a plurality of single-mode light beams are subjected to optical intensity modulation before optical phase modulation, optical phase modulation may be performed before optical intensity modulation, which can provide substantially a similar effect. In this case, specifically, a multimode light source may comprise a plurality of light sources for phase-modulating light beams having wavelengths different from each other and outputting the result, a plurality of optical intensity modulating sections for intensity-modulating the light beams output from the light sources, an optical mode combining section for combining the optical signals output from the optical intensity modulating sections, a first code generating section for causing the total intensity of light output from the optical mode combining section to be constant, and inputting to each light source a code which is a modulation signal for substantially randomly modulating the phases of light beams to be output from the light sources, and a second code generating section for inputting to each optical intensity modulating section a code for synchronizing intensity changes of light beams to be output from the optical intensity modulating sections. Thereby, the optical intensity modulating section and the second code generating section function as an optical intensity synchronizing section for synchronizing the intensity changes of light beams output from the light sources. With such a configuration, it is possible to artificially generate multimode light whose optical fluctuations have a predetermined synchronous relationship with each other, and output light similar to light output from the multimode light source 101 of FIG. 2.

Although it has been described in the second variation that three light sources are used, two or four or more light sources may be used. In this case, optical phase modulating sections need to be provided, depending on the number of light sources. Also, the first code generating section 5001 generates substantially randomly varying predetermined code sequences corresponding to the respective light sources so that the output optical intensities of the light sources are modulated based on the code sequences. The second code generating section 5002 generates substantially randomly varying predetermined code sequences corresponding to the respective optical phase modulating sections so that phases of output light beams from the optical phase modulating sections are modulated based on the code sequences and a constant total optical intensity is output from the optical mode combining section 402. Thereby, it is possible to artificially generate multimode light whose optical fluctuations have a predetermined synchronous relationship with each other, and output light similar to light output from the multimode light source 101 of FIG. 2.

As described above, according to the first embodiment, noise occurring when a correlation relationship in optical intensity or optical phase between oscillation-mode light components of multimode oscillating light is changed, is utilized, and a pattern of changes in optical intensity or optical phase between the oscillation-mode light components is shared as a "secret key" between a sender and an authorized receiver, thereby making it possible to provide an optical transmission device which significantly prevents eavesdropping by the third party, i.e., has a high level of secrecy.

Second Embodiment

Figure 7:
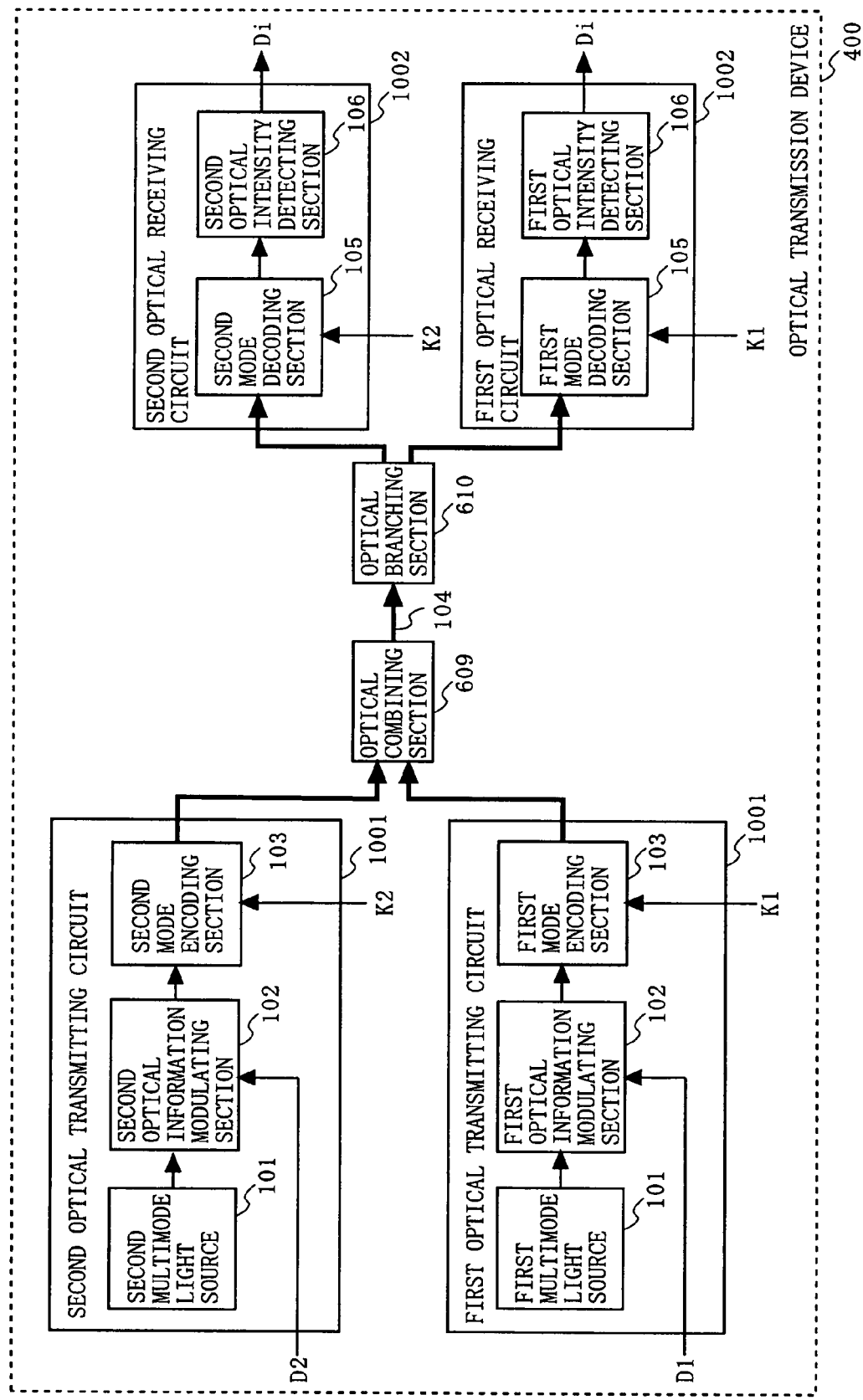
FIG. 7 is a diagram illustrating a configuration of an optical transmission device 400 according to a second embodiment of the present invention.

FIG. 7 is a diagram illustrating a configuration of an optical transmission device 200 supporting encrypted communication according to a second embodiment of the present invention. In FIG. 7, the optical transmission device 200 of this embodiment comprises a plurality of pairs of the optical transmitting circuit 1001 and the optical receiving circuit 1002 of FIG. 2 (two pairs in FIG. 7). The optical transmission device 200 comprises first and second multimode light sources 101, first and second optical information modulating sections 102, first and second mode encoding sections 103, an optical combining section 609, an optical transmission channel 104, an optical branching section 610, first and second mode decoding sections 105, and first and second optical intensity detecting sections 106. Note that the first (second) multimode light source 101, the first (second) optical information modulating section 102, and the first (second) mode encoding section 103 constitute the first (second) optical transmitting circuit 1001. The first (second) mode decoding section 105, and the first (second) optical intensity detecting section 106 constitute the first (second) optical receiving circuit 1002.

Next, an operation of this embodiment of FIG. 7 will be described. The configuration of this embodiment is similar to that of the above-described first embodiment (FIG. 2), and therefore, blocks for performing the same operations are indicated by the same reference numerals and will not be described, and only differences will be hereinafter described. In this configuration, the optical transmission device 200 of this embodiment comprises two pairs of the optical transmitting circuit 1001 and the optical receiving circuit 1002. The first and second optical information modulating sections 102 modulate light beams output from the corresponding first and second multimode light sources 101 using first and second information signals (D1 and D2), and output the result as first and second optical signals. The first and second mode encoding sections 103 subject the corresponding first and second optical signals to a predetermined pattern of encoding operation (first operation), based on source codes K1 and K2 different from each other. The optical combining section 609 combines optical signal components output from the first and second optical transmitting circuits 1001, and outputs the result to the optical transmission channel 104. The optical branching section 610 branches the optical signal component transmitted through the optical transmission channel 104, and outputs the result to the corresponding optical receiving circuits 1002. The first and second mode decoding sections 105 receive and subject the optical signals output from the optical branching section 610, to a predetermined pattern of decoding operation (second operation), based on the respective source codes K1 and K2 shared with the corresponding first and second mode encoding sections 103, and output the result. The first and second optical intensity detecting sections 106 squared-detect the output signals output from the corresponding first and second mode decoding sections 105, and output the respective first and second information signals (D1 and D2).

Note that the first and second optical signals may be set within wavelength bands different from each other, or the whole or a part of the light spectra may be set within the same wavelength band.

Although it has been described in this embodiment that the first and second optical signals are multiplexed and transmitted, the number of signals multiplexed may be any plural number other than two.

Further, the multimode light source used in the second embodiment may be a multimode light source as described in FIG. 5 or 6.

As described above, according to the second embodiment, in each of a plurality of transmission and reception circuit pairs, noise occurring when a correlation relationship in optical intensity or optical phase between oscillation-mode light components is changed, is utilized, and a pattern of changes in optical intensity or optical phase between the oscillation-mode light components is shared as a "secret key" between a sender and an authorized receiver. Thereby it is possible to provide an optical transmission device which significantly suppresses mutual interference and information leakage, i.e., has a high level of secrecy.

Third Embodiment

Figure 8:
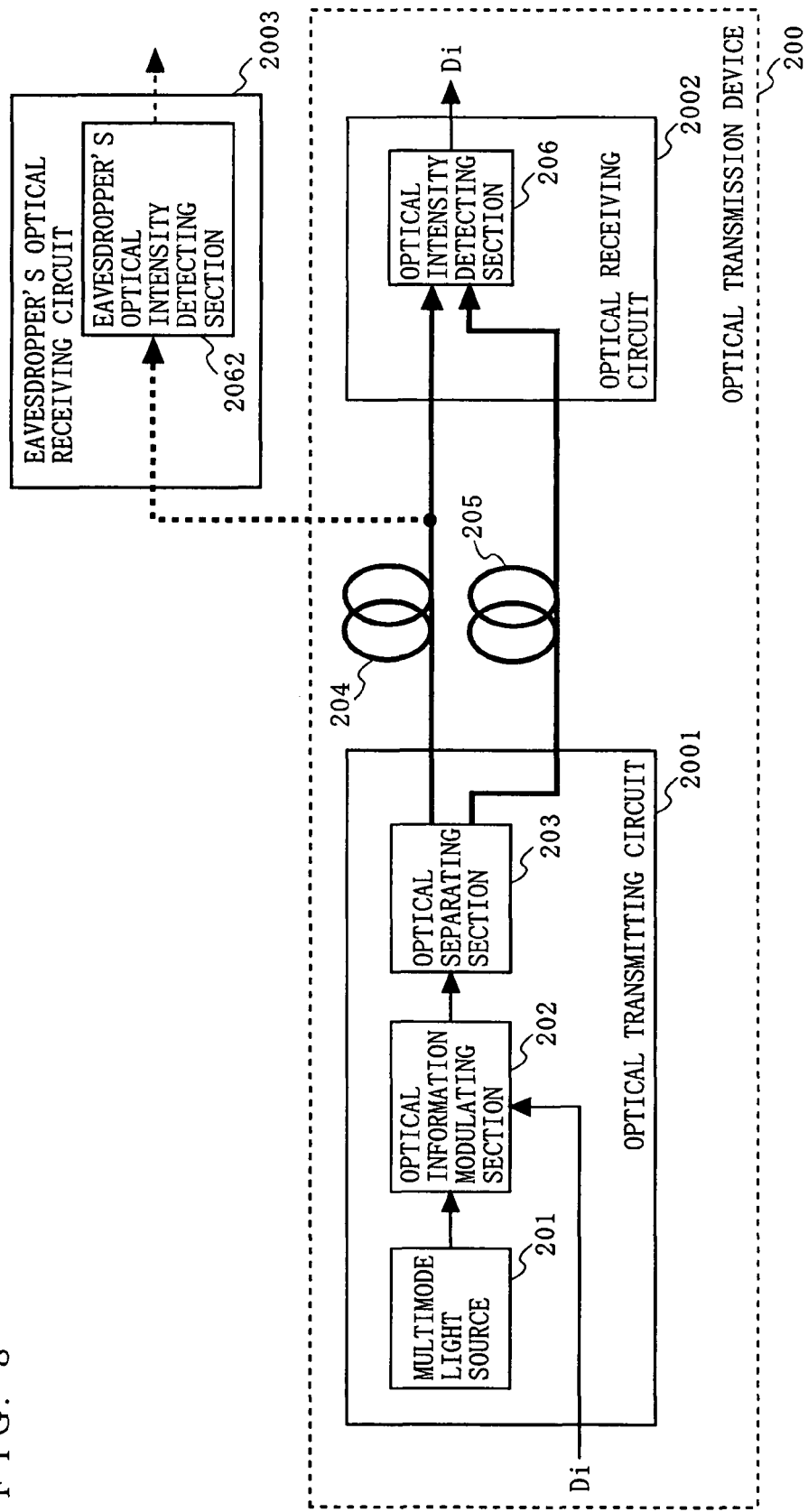
FIG. 8 is a diagram illustrating a configuration of an optical transmission device 200 supporting encrypted communication according to a third embodiment of the present invention.
Figure 9A:
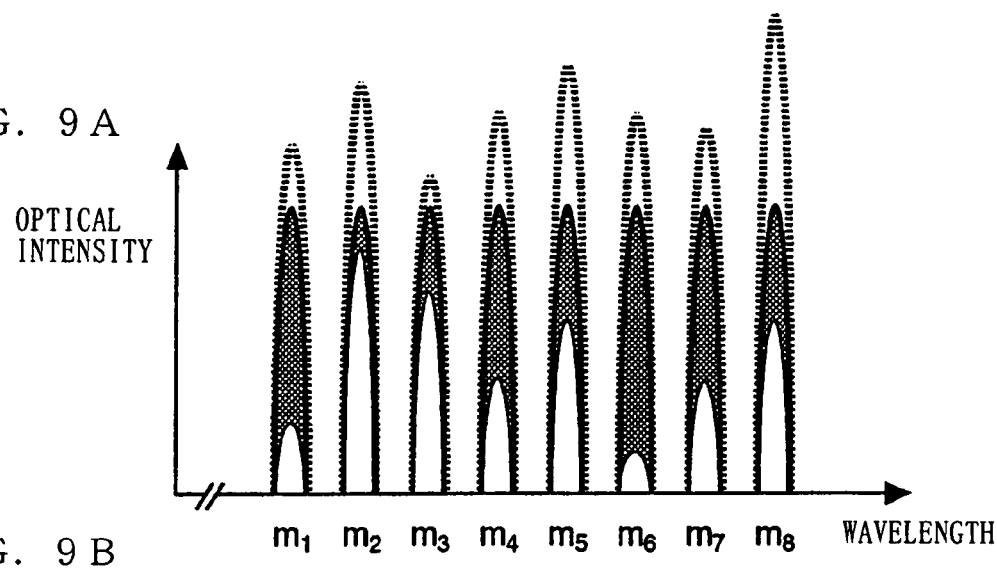
FIG. 9A is a schematic diagram illustrating exemplary spectra of light (optical signals) in major parts of the optical transmission device 200 of FIG. 8.
Figure 9B:
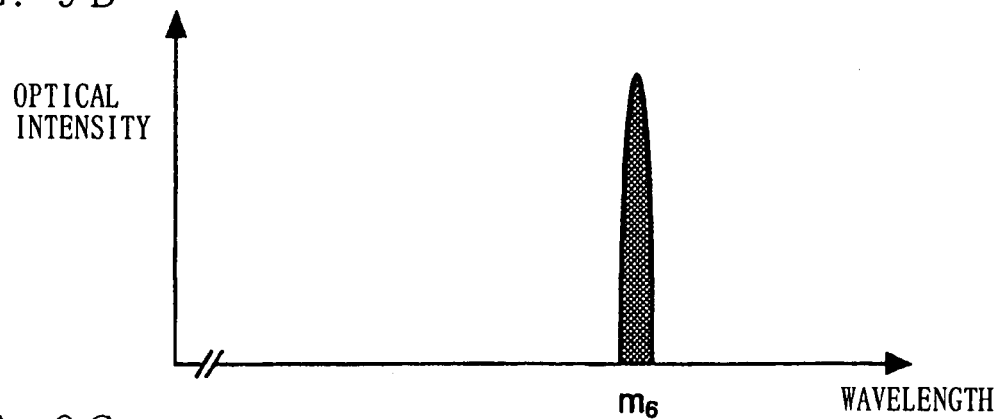
FIG. 9B is a schematic diagram illustrating exemplary spectra of light (optical signals) in the major parts of the optical transmission device 200 of FIG. 8.
Figure 9C:
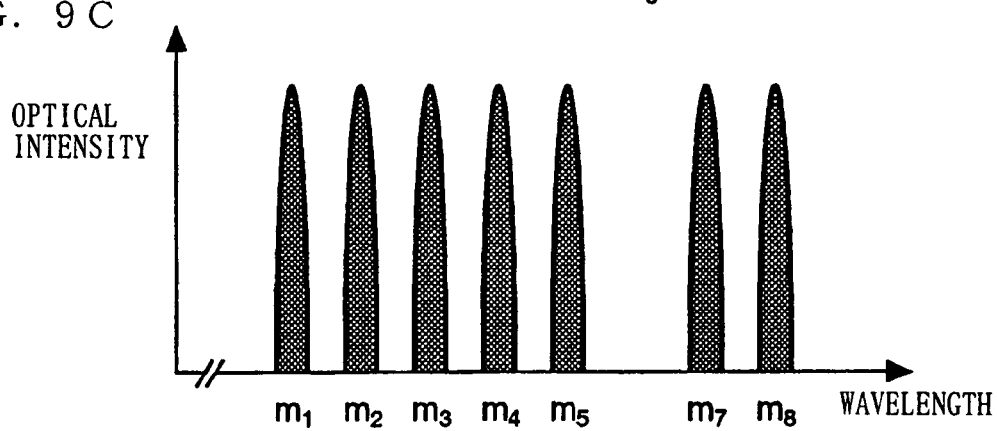
FIG. 9C is a schematic diagram illustrating exemplary spectra of light (optical signals) in the major parts of the optical transmission device 200 of FIG. 8.

FIG. 8 is a diagram illustrating a configuration of an optical transmission device 200 supporting encrypted communication according to a third embodiment of the present invention. FIGS. 9A to 9C are schematic diagrams illustrating spectra of light (optical signals) in major parts of the optical transmission device 200 of FIG. 8.

In FIG. 8, the optical transmission device 200 of this embodiment comprises a multimode light source 201, an optical information modulating section 202, an optical separating section 203, a main optical transmission channel 204, a subsidiary optical transmission channel 205, and an optical intensity detecting section 206. The multimode light source 201, the optical information modulating section 202, and the optical separating section 203 constitute an optical transmitting circuit 2001. The optical intensity detecting section 206 constitutes an optical receiving circuit 2002. Note that, in FIG. 8, in order to describe an operation of this embodiment, an eavesdropper's optical receiving circuit 2003 comprising an eavesdropper's optical intensity detecting section 2062 is also illustrated.

Next, an operation of this embodiment of FIG. 8 will be described. The multimode light source 201 comprises a light source which oscillates light in a plurality of (longitudinal) modes (8 modes: m1 to m8 in FIG. 9A) over a predetermined wavelength band as illustrated in FIG. 9A, and outputs such light. Specific examples of such a multimode oscillation light source include an LED (Light Emission Diode), an FP (Fabry-Perot) laser, an RC (Resonant Cabity)-LED, a VCSEL (Vertical Cabity Surface Emitting Laser), and an SLD (Super Luminescent Diode). In these output light spectra, both parameters (optical intensity and optical phase) in each oscillation-mode light beam fluctuate at a high rate. In these light sources, although an optical intensity fluctuation component and an optical phase fluctuation component in each oscillation-mode light beam are correlated with optical intensity fluctuation components and optical phase fluctuation components in other oscillation-mode light beams, a total optical intensity of light output from the multimode light source 201 has a property of indicating substantially a constant value.

The optical information modulating section 202 modulates the light output from the multimode light source 201 using an information signal Di to be transmitted, and outputs the resultant signal as an optical signal.

The optical separating section 203 receives the optical signal output from the optical information modulating section 202, extracts and separates only a predetermined-mode light beam of a plurality of oscillation-mode light beams, and transmits the predetermined-mode light beam to the subsidiary optical transmission channel 205 and the remaining optical signal components to the main optical transmission channel 204. For example, as illustrated in FIG. 9B, the optical separating section 203 extracts and separates a sixth oscillation-mode light beam (m6), and transmits the light beam to the subsidiary optical transmission channel 205. Further, as illustrated in FIG. 9C, the optical separating section 203 extracts and separates the remaining optical signal components (m1 to m5, m7 and m8), and transmits the components to the main optical transmission channel 204.

The optical intensity detecting section 206 combines the optical signal components transmitted through the main optical transmission channel 204 and the predetermined oscillation-mode light transmitted through the subsidiary optical transmission channel 205, and thereafter, performs square-detection to detect a modulation component of a total optical intensity, thereby reproducing the original information signal Di.

Next, in this embodiment, the reason why eavesdropping cannot be performed by the third party (the eavesdropper's optical receiving circuit 2003) will be described.

It is here assumed that the eavesdropper's optical receiving circuit 2003 does not receive the predetermined oscillation-mode light propagating through the subsidiary optical transmission channel 205, and branches and inputs a portion of the optical signal propagating through the main optical transmission channel 204 to the eavesdropper's optical intensity detecting section 2062. The eavesdropper's optical intensity detecting section 2062 converts the input optical signal into an electrical signal, and outputs the electrical signal. Since it is assumed that he eavesdropper's optical intensity detecting section 2062 does not receive the predetermined oscillation-mode light separately propagating through the subsidiary optical transmission channel 205, only the remaining optical signal components (FIG. 9C) other than the oscillation-mode light are subjected to squared detection. In other words, the eavesdropper's optical intensity detecting section 2062 detects a modulation component of a total optical intensity while some oscillation-mode light is missing from multimode light oscillating while keeping a correlation between the optical intensity fluctuation component and the optical phase fluctuation component. Therefore, a fluctuation component of each oscillation-mode light beam appears in a detected signal, so that mode partition noise occurs. Therefore, eavesdropper's reception signal quality (SNR: signal-to-noise power ratio) is deteriorated as compared to authorized receivers (the optical receiving circuit 2002). Therefore, a high level of secrecy can be secured.

Although it has been described in the third embodiment above that six modes are used, at least two modes may be used.

Although it has been described in the third embodiment above that a single oscillation-mode light beam (m6 in FIG. 9B) is separated and extracted by the optical separating section 203, two or more oscillation-mode light beams may be separated and extracted.

(First Variation)

Figure 10:
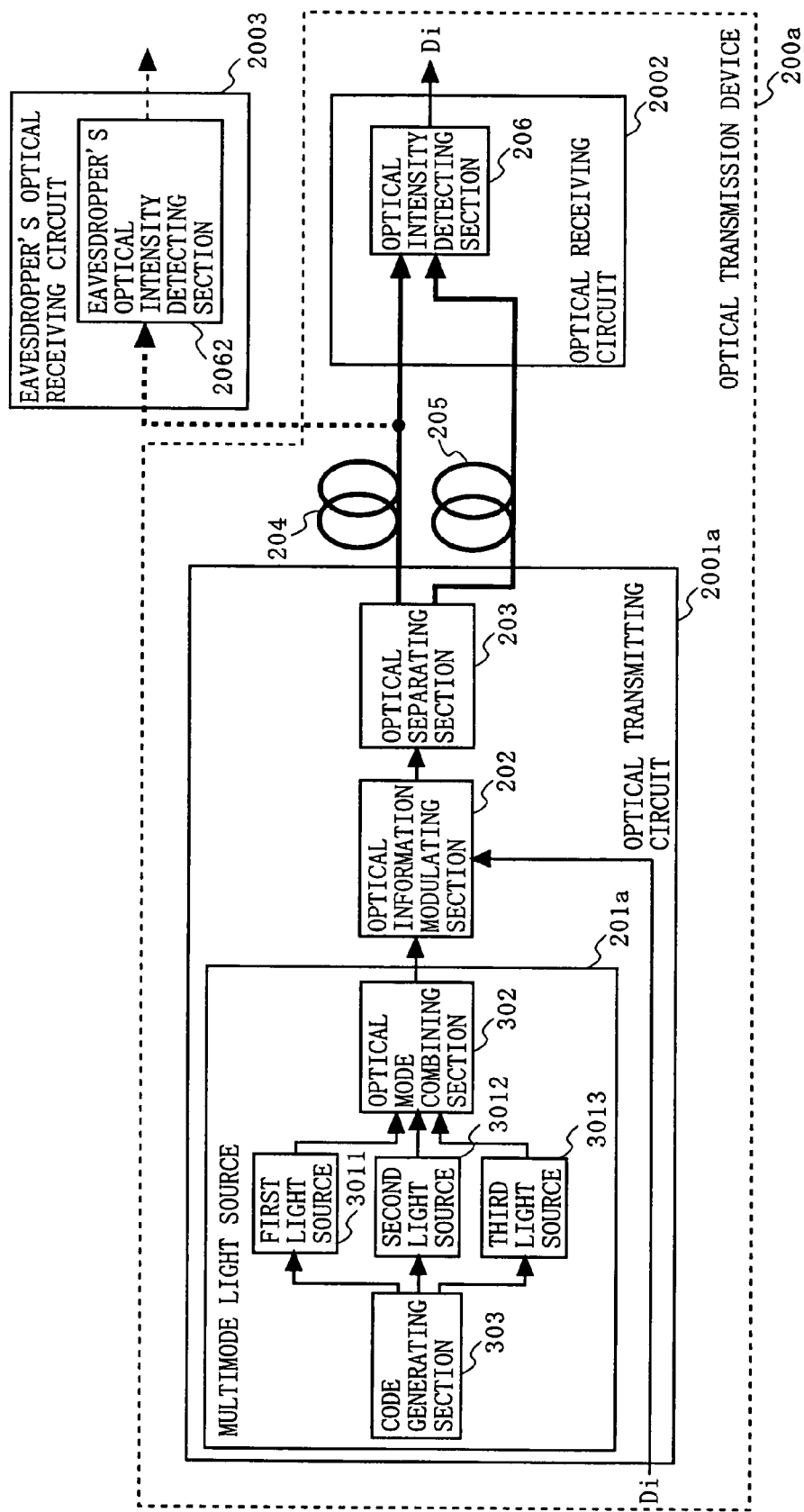
FIG. 10 is a diagram illustrating a configuration of an optical transmission device 200a according to a first variation of the third embodiment.

Next, a first variation of the third embodiment will be described. FIG. 10 is a diagram illustrating a configuration of an optical transmission device 200*a* according to the first variation of the third embodiment. In FIG. 10, an optical transmitting circuit 2001*a* of the optical transmission device 200*a* is obtained by replacing the multimode light source 201 of FIG. 8 with a multimode light source 201*a*. The other parts of the optical transmission device 200*a* are the same as those of FIG. 1. The multimode light source 201*a* includes a first light source 3011, a second light source 3012, a third light source 3013, an optical mode combining section 302, and a code generating section 303.

In this configuration, the first to third light sources 3011 to 3013 oscillate and output single-mode light beams whose wavelengths are different each other and whose phases are synchronized in a predetermined relationship. The optical mode combining section 302 combines the output light beams from the first to third light sources 3011 to 3013, and outputs the result. The code generating section 303 generates substantially randomly varying predetermined code sequences C1 to C3 corresponding to the first to third light sources 3011 to 3013 so that optical intensities of the first to third light sources 3011 to 3013 are substantially randomly modulated in such a manner that a constant total optical intensity is output from the optical mode combining section 302. Thereby, it is possible to artificially generate multimode light whose optical fluctuation components have a predetermined synchronous relationship with each other, and generate noise similar to the partition noise when any single-mode light beam is missing.

Although it has been described in the first variation that a plurality of single-mode light beams whose phases are synchronized are generated, and optical intensities thereof are separately modulated, optical intensity fluctuations may be synchronized or optical intensities may be stabilized into a constant value, and substantially random optical phase modulation may be separately performed, which can provide substantially a similar effect. In this case, specifically, as the first to third light source 3011 to 3013, light sources are used which oscillate and output phase-modulated single-mode light beams whose wavelengths are different each other and whose optical intensities are synchronized in a predetermined relationship. The code generating section 303 generates substantially randomly varying predetermined code sequences C1 to C3 corresponding to the first to third light sources 3011 to 3013 so that optical phases of the first to third light sources 3011 to 3013 are substantially randomly modulated in such a manner that a constant total optical intensity is output from the optical mode combining section 302. Thereby, it is possible to artificially generate multimode light whose optical fluctuation components have a predetermined synchronous relationship with each other, and generate noise similar to the partition noise when any single-mode light beam is missing.

Although it has been described in the first variation that three light sources are used, two or four or more light sources may be used. Also in this case, the code generating section 303 generates substantially randomly varying predetermined code sequences corresponding to the respective light sources so that optical intensities of the light sources are substantially randomly modulated in such a manner that a constant total optical intensity is output from the optical mode combining section 302. Thereby, it is possible to artificially generate multimode light whose optical fluctuation components have a predetermined synchronous relationship with each other, and generate noise similar to the partition noise when any single-mode light beam is missing.

(Second Variation)

Figure 11:
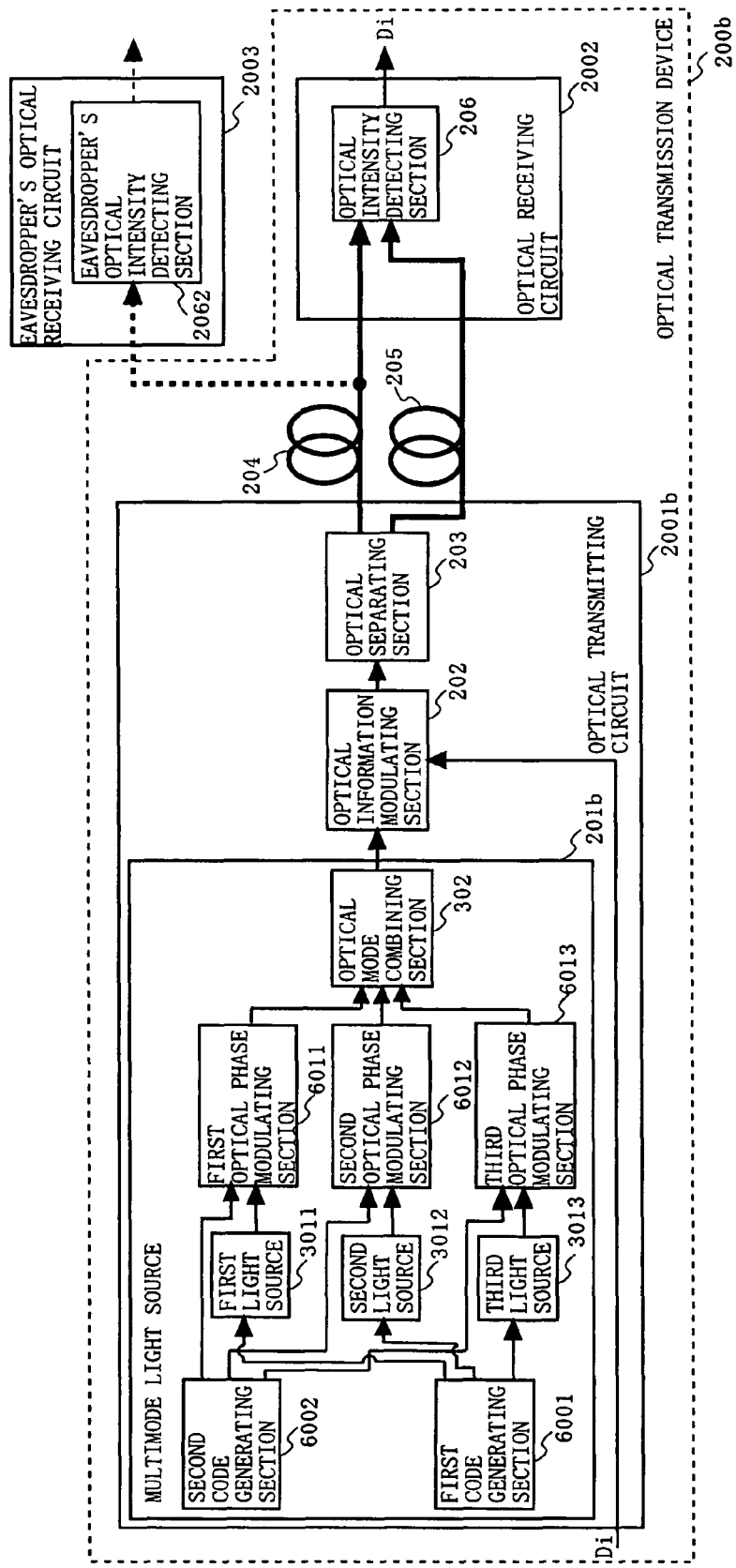
FIG. 11 is a diagram illustrating a configuration of an optical transmission device 200b according to a second variation of the third embodiment.

Next, a second variation of the third embodiment will be described. FIG. 11 is a diagram illustrating a configuration of an optical transmission device 200*b* of the second variation of the third embodiment. In FIG. 11, an optical transmitting circuit 2001*b* of the optical transmission device 200*b* is obtained by replacing the multimode light source 201 of FIG. 8 with a multimode light source 201*b*. The other parts of the optical transmission device 200*b* are the same as those of FIG. 8. The multimode light source 201*b* includes a first light source 3011, a second light source 3012, a third light source 3013, an optical mode combining section 302, a first code generating section 6001, a second code generating section 6002, a first optical phase modulating section 6011, a second optical phase modulating section 6012, and a third optical phase modulating section 6013.

In this configuration, the first to third light sources 3011 to 3013 oscillate and output single-mode light beams whose wavelengths are different from each other. The first to third optical phase modulating sections 6011 to 6013 are provided, corresponding to the first to third light sources 3011 to 3013, modulate phases of output light beams from the first to third light sources 3011 to 3013, and output the result. The optical mode combining section 302 combines the optical signals output from the first to third optical phase modulating sections 6011 to 6013, and outputs the result. The first code generating section 6001 generates substantially randomly varying predetermined code sequences C1 to C3 corresponding to the first to third light sources 3011 to 3013 so that output optical intensities of the first to third light sources 3011 to 3013 are substantially randomly modulated based on the code sequences. The second code generating section 6002 generates substantially randomly varying predetermined code sequences D1 to D3 corresponding to the first to third optical phase modulating sections 6011 to 6013 so that phases of output light beams from the first to third optical phase modulating sections 6011 to 6013 are modulated based on the code sequences in such a manner that the phase changes are synchronized and a constant total optical intensity is output from the optical mode combining section 302. The first to third optical phase modulating sections 6011 to 6013 and the second code generating section 6002 are considered as an optical phase synchronizing section for synchronizing the phase changes of light beams output from the first to third light sources 3011 to 3013. Also, the first code generating section 6001 is considered as a code generating section for causing the total intensity of light output from the optical mode combining section 302 to be constant, and supplying to each light source a code which is a modulation signal for substantially randomly modulating the intensities of light beams to be output from the first to third light sources 3011 to 3013. Thus, in the second variation, it is possible to artificially generate multimode light whose optical fluctuations have a predetermined synchronous relationship with each other, and generate noise similar to the partition noise when any single-mode light beam is missing.

Although it has been described in this embodiment that a plurality of single-mode light beams are subjected to optical intensity modulation before optical phase modulation, optical phase modulation may be performed before optical intensity modulation, which can provide substantially a similar effect. In this case, specifically, an optical transmission device may comprise a plurality of light sources for phase-modulating and outputting light beams having wavelengths different from each other, a plurality of optical intensity modulating sections for intensity-modulating the light beams output from the light sources, an optical mode combining section for combining the optical signals output from the optical intensity modulating sections, a first code generating section for causing the total intensity of light output from the optical mode combining section to be constant, and inputting to each light source a code which is a modulation signal for substantially randomly modulating the phases of light beams to be output from the light sources, and a second code generating section for inputting to each optical intensity modulating section a code for synchronizing intensity changes of light to be output from the optical intensity modulating sections. Thereby, the optical intensity modulating section and the second code generating section function as an optical intensity synchronizing section for synchronizing the intensity changes of light beams output from the light sources. With such a configuration, it is possible to artificially generate multimode light whose optical fluctuations have a predetermined synchronous relationship with each other, and generate noise similar to the partition noise when any single-mode light beam is missing.

Although it has been described in the second variation that three light sources are used, two or four or more light sources may be used. In this case, optical phase modulating sections need to be provided, depending on the number of light sources. Also, the first code generating section 6001 generates substantially randomly varying predetermined code sequences corresponding to the respective light sources so that the output optical intensities of the light sources are modulated based on the code sequences. The second code generating section 6002 generates substantially randomly varying predetermined code sequences corresponding to the respective optical phase modulating sections so that the phases of output light beams from the optical phase modulating sections are modulated based on the code sequences and a constant total optical intensity is output from the optical mode combining section 302. Thereby, it is possible to artificially generate multimode light whose optical fluctuations have a predetermined synchronous relationship with each other, and generate noise similar to the partition noise when any single-mode light beam is missing.

As described above, according to the third embodiment, noise occurring when predetermined oscillation-mode light is removed from multimode oscillating light, is utilized, and the predetermined oscillation-mode light is shared as a "secret key" between a sender and an authorized receiver, thereby making it possible to provide an optical transmission device which significantly prevents eavesdropping by the third party, i.e., has a high level of secrecy.

Although it has been here described that the whole power of predetermined oscillation-mode light is extracted as illustrated in FIG. 9B, only a portion of the power of the predetermined oscillation-mode light may be extracted, and the remaining optical signal components may be transmitted to the optical receiving circuit.

Figure 12:
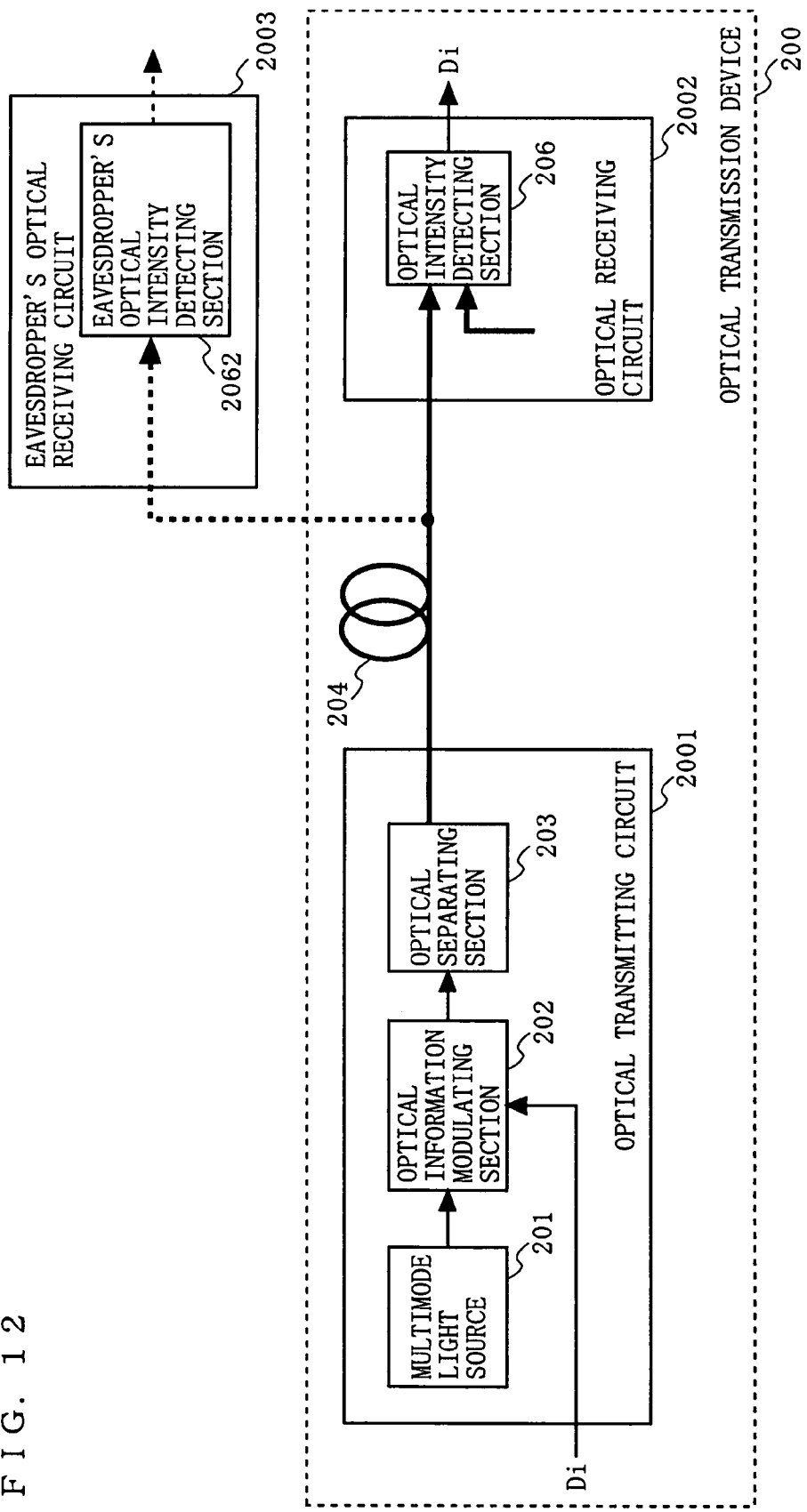
FIG. 12 is a diagram illustrating a configuration of an optical transmission device 200 according to another example of the third embodiment.

Note that, as illustrated in FIG. 12, light similar to oscillation-mode light extracted by the optical separating section 203 may be input to the optical intensity detecting section 206 by any means without via the subsidiary optical transmission channel 205.

Fourth Embodiment

Figure 13:
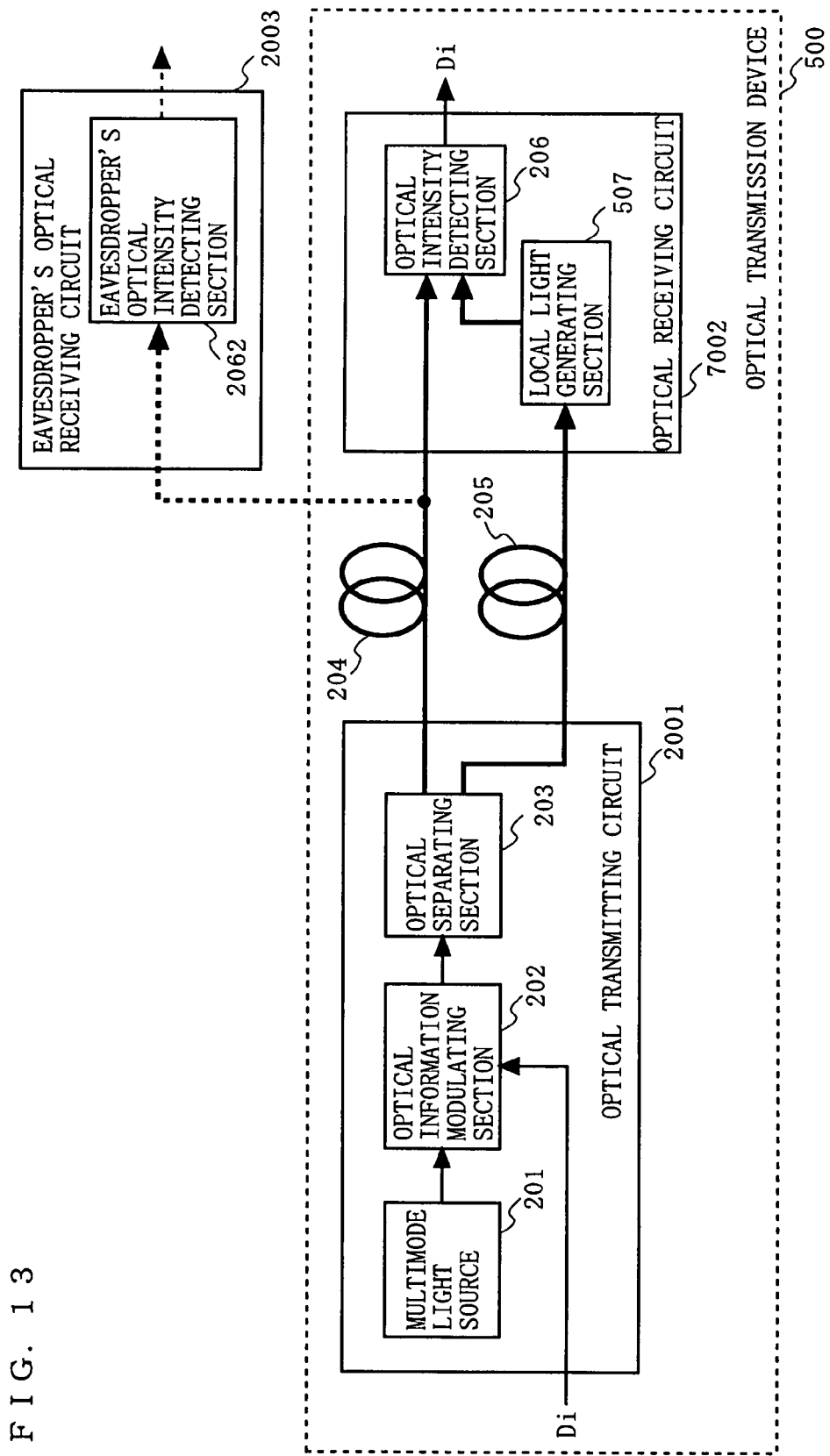
FIG. 13 is a diagram illustrating a configuration of an optical transmission device 500 according to a fourth embodiment of the present invention.

FIG. 13 is a diagram illustrating a configuration of an optical transmission device 500 supporting encrypted communication according to a fourth embodiment of the present invention. In FIG. 13, the optical transmission device 500 of this embodiment comprises a multimode light source 201, an optical information modulating section 202, an optical separating section 203, a main optical transmission channel 204, a subsidiary optical transmission channel 205, an optical intensity detecting section 206, and a local light generating section 507. The optical transmission device 500 of the fourth embodiment is different from the configuration of FIG. 8 in the local light generating section 507 which is newly provided, and a connection relationship. The multimode light source 201, the optical information modulating section 202, and the optical separating section 203 constitute an optical transmitting circuit 2001. The optical intensity detecting section 206 and the local light generating section 507 constitute an optical receiving circuit 7002. Also, in FIG. 13, similar to FIG. 8, in order to describe an operation of this embodiment, an eavesdropper's optical receiving circuit 2003 comprising an eavesdropper's optical intensity detecting section 2062 is also illustrated.

Next, an operation of this embodiment of FIG. 13 will be described. The configuration of this embodiment is similar to that of the above-described third embodiment (FIG. 8), and therefore, blocks for performing the same operations are indicated by the same reference numerals and will not be described, and only differences will be hereinafter described.

In the optical transmission device 500 of this embodiment, the local light generating section 507 receives predetermined oscillation-mode light transmitted through the subsidiary optical transmission channel 205, and generates and outputs local light having the same optical intensity fluctuation information and optical phase fluctuation information. Specifically, the local light generating section 507 has an optical injection synchronization configuration which injects predetermined oscillation-mode light into a semiconductor laser, to generate local light (light similar to the predetermined oscillation-mode light) having the same physical property as that of the predetermined oscillation-mode light. The optical intensity detecting section 206 combines an optical signal component transmitted through the main optical transmission channel 204 and the local light output from the local light generating section 507, and thereafter, subjects the result to squared detection to detect a modulation component of a total optical intensity, thereby reproducing an original information signal Di.

In this embodiment, when eavesdropping is performed using the eavesdropper's optical receiving circuit 2003, only the remaining optical signal components excluding the predetermined oscillation-mode light are input to the eavesdropper's optical intensity detecting section 2062, as in FIG. 8. Therefore, mode partition noise occurs, so that the reception signal quality is deteriorated as compared to that in the optical receiving circuit 7002, thereby making it possible to secure a high level of secrecy.

As described above, according to the fourth embodiment, noise occurring when predetermined oscillation-mode light is removed from multimode oscillating light, is utilized, and light having the same physical property as that of the predetermined oscillation-mode light is shared as a "secret key" between a sender and an authorized receiver, thereby making it possible to easily provide an optical transmission device which significantly prevents eavesdropping by the third party, i.e., has a high level of secrecy.

Note that, in the fourth embodiment, the multimode light source 201 may be replaced with the multimode light source 201a (see FIG. 10) comprising a plurality of single-mode light sources as indicated in the first variation, or may be replaced with the multimode light source 201b (see FIG. 11) comprising a plurality of single-mode light sources and an optical phase modulating section.

Fifth Embodiment

Figure 14:
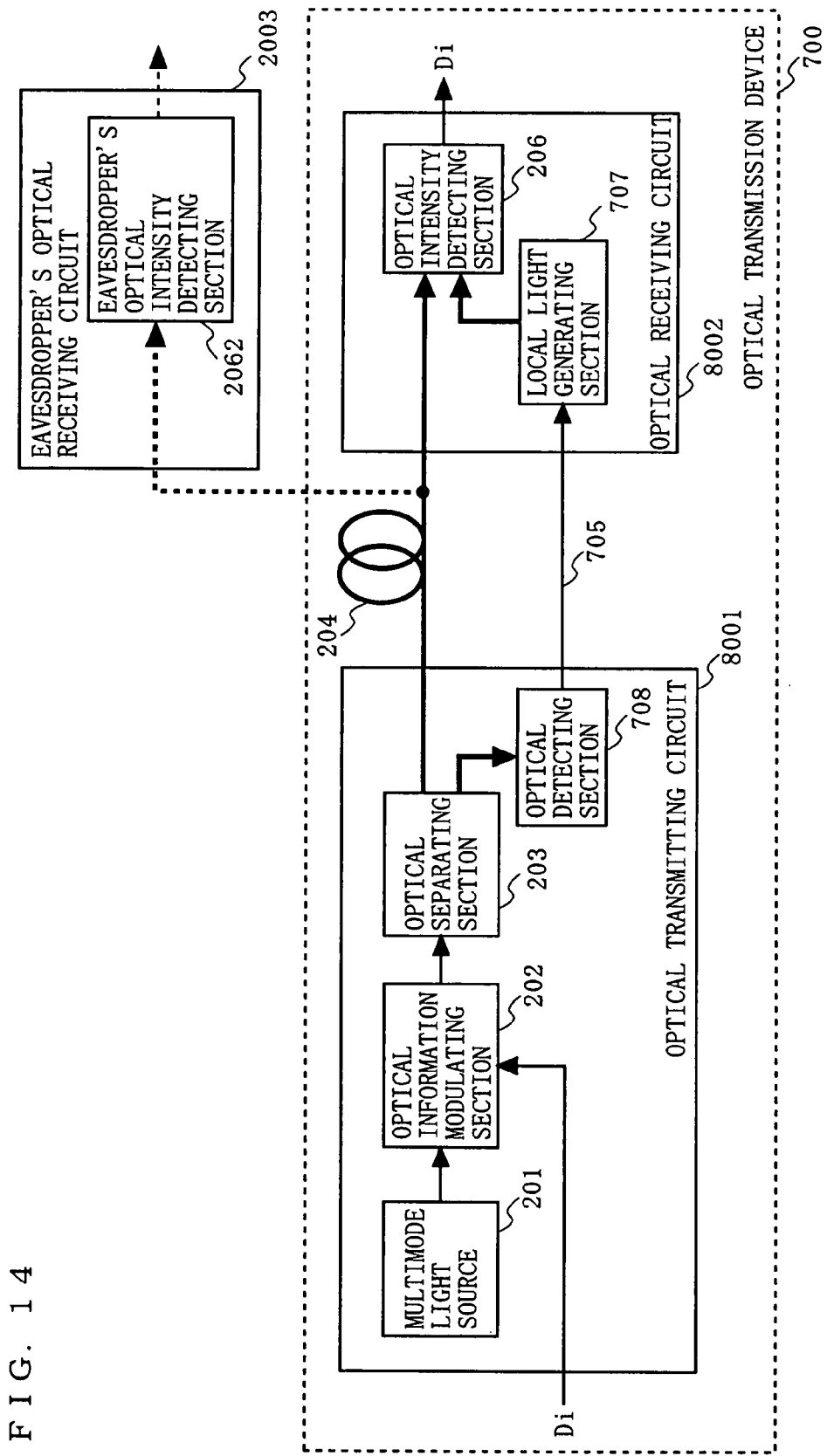
FIG. 14 is a diagram illustrating a configuration of an optical transmission device 700 according to a fifth embodiment of the present invention.

FIG. 14 is a diagram illustrating a configuration of an optical transmission device 700 supporting encrypted communication according to a fifth embodiment of the present invention. In FIG. 14, the optical transmission device 700 of this embodiment comprises a multimode light source 201, an optical information modulating section 202, an optical separating section 203, a main optical transmission channel 204, an optical intensity detecting section 206, a subsidiary transmission channel 705, a local light generating section 707, and an optical detecting section 708. The optical transmission device 700 of the fifth embodiment is different from the configuration of FIG. 8 in the subsidiary transmission channel 705 which is provided instead of the subsidiary optical transmission channel 205, the local light generating section 707 and the optical detecting section 708 which are newly provided, and a connection relationship. The multimode light source 201, the optical information modulating section 202, the optical separating section 203, and the optical detecting section 708 constitute an optical transmitting circuit 8001. The optical intensity detecting section 206 and the local light generating section 707 constitute an optical receiving circuit 8002. Also, in FIG. 14, similar to FIG. 8, in order to describe an operation of this embodiment, an eavesdropper's optical receiving circuit 2003 comprising an eavesdropper's optical intensity detecting section 2062 is also illustrated.

Next, an operation of this embodiment of FIG. 14 will be described. The configuration of this embodiment is similar to that of the above-described first embodiment (FIG. 8), and therefore, blocks for performing the same operations are indicated by the same reference numerals and will not be described, and only differences will be hereinafter described.

In the optical transmission device 700 of this embodiment, the optical detecting section 708 detects predetermined oscillation-mode light separated and extracted by the optical separating section 203 to detect and output the optical intensity fluctuation information and the optical phase fluctuation information to the subsidiary transmission channel 705. Based on the optical intensity fluctuation information and the optical phase fluctuation information transmitted through the subsidiary transmission channel 705, the local light generating section 707 generates and outputs local light (light similar to the predetermined oscillation-mode light) including the information. The optical intensity detecting section 206 combines an optical signal component transmitted through the main optical transmission channel 204 and the local light output from the local light generating section 707, and thereafter, subjects the result to squared detection to detect a modulation component of a total optical intensity, thereby reproducing an original information signal Di.

In this embodiment, when eavesdropping is performed using the eavesdropper's optical receiving circuit 2003, only the remaining optical signal components excluding the predetermined oscillation-mode light are input to the eavesdropper's optical intensity detecting section 2062, as in FIG. 8. Therefore, mode partition noise occurs, so that the reception signal quality is deteriorated as compared to that in the optical receiving circuit 8002, thereby making it possible to secure a high level of secrecy.

As described above, according to the fifth embodiment, noise occurring when predetermined oscillation-mode light is removed from multimode oscillating light, is utilized, and light having the same physical property as that of the predetermined oscillation-mode light is shared as a "secret key" between a sender and an authorized receiver, thereby making it possible to easily provide an optical transmission device which significantly prevents eavesdropping by the third party, i.e., has a high level of secrecy.

Note that, in the fifth embodiment, the multimode light source 201 may be replaced with the multimode light source 201a (see FIG. 10) comprising a plurality of single-mode light sources as indicated in the first variation, or may be replaced with the multimode light source 201b (see FIG. 11) comprising a plurality of single-mode light sources and an optical phase modulating section.

Sixth Embodiment

Figure 15:
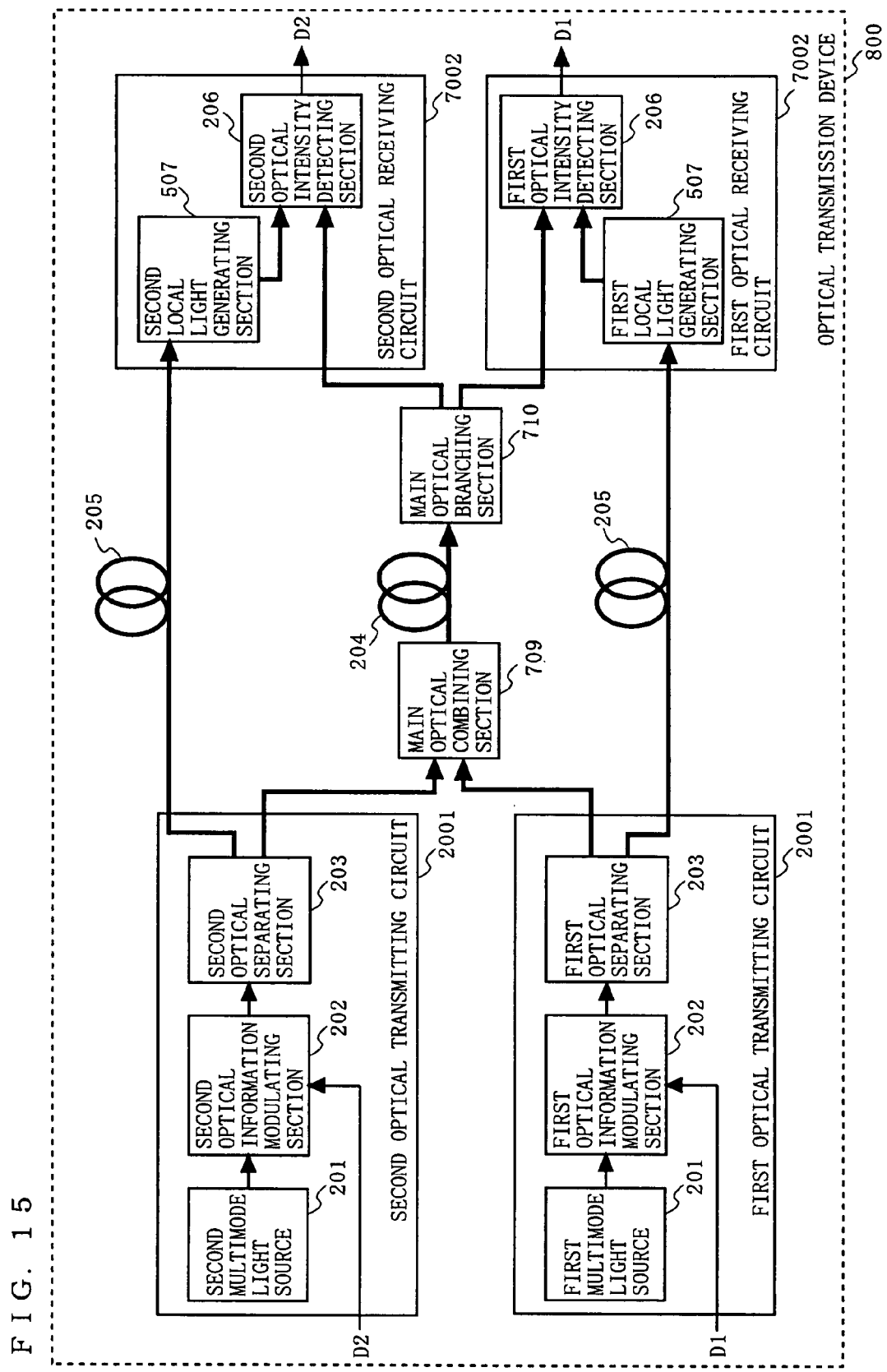
FIG. 15 is a diagram illustrating a configuration of an optical transmission device 800 according to a sixth embodiment of the present invention.

FIG. 15 is a diagram illustrating a configuration of an optical transmission device 800 supporting encrypted communication according to a sixth embodiment of the present invention. In FIG. 15, the optical transmission device 800 of this embodiment comprises a plurality of pairs (two pairs in FIG. 15) of the optical transmitting circuit 2001 and the optical receiving circuit 7002 of FIG. 13. The optical transmission device 800 comprises first and second multimode light sources 201, first and second optical information modulating sections 202, first and second optical separating sections 203, a main optical transmission channel 204, first and second subsidiary optical transmission channels 205, first and second optical intensity detecting sections 206, first and second local light generating sections 507, a main optical combining section 709, and a main optical branching section 710. The optical transmission device 800 of this embodiment is different from the configuration of FIG. 13 in that the main optical combining section 709 and the main optical branching section 710 are newly provided. Note that the first (second)

multimode light source 201, the first (second) optical information modulating section 202, and the first (second) optical separating section 203 constitute the first (second) optical transmitting circuit 2001. The first (second) optical intensity detecting section 206 and the first (second) local light generating section 507 constitute the first (second) optical receiving circuit 7002.

Next, an operation of this embodiment of FIG. 15 will be described. The configuration of this embodiment is similar to that of the above-described fourth embodiment (FIG. 13), and therefore, blocks for performing the same operations are indicated by the same reference numerals and will not be described, and only differences will be hereinafter described.

The optical transmission device 800 of this embodiment comprises two pairs of the optical transmitting circuits 2001 and the optical receiving circuit 7002. The first and second optical information modulating sections 202 modulate light beams output from the corresponding first and second multimode light source 201 using first and second information signals (D1 and D2), and output the result as first and second optical signals, respectively. The first and second optical separating sections 203 receive the first and second optical signals output from the corresponding first and second optical information modulating sections 202, separate and extract respective predetermined-mode light beams from the oscillation-mode light beams, and transmit the extracted beams to the first and second subsidiary optical transmission channel 205, and remaining optical signal components to the main optical combining section 709. The main optical combining section 709 combines optical signal components output from the first and second optical separating sections 203, and outputs the result to the main optical transmission channel 204. The main optical branching section 710 branches the optical signal component transmitted through the main optical transmission channel 204, and inputs the result to the first and second optical intensity detecting section 206. The first and second optical intensity detecting sections 206 combine the optical signal component output from the main optical branching section 710 and the predetermined oscillation-mode light output from the corresponding first and second local light generating sections 507, and thereafter, subjects the result to squared detection to detect a modulation component of a total optical intensity, thereby reproducing first and second information signals (D1 and D2), respectively.

Further, setting of wavelengths of the first and second optical signals output from the first and second optical information modulating sections 202 and the predetermined oscillation-mode light beams extracted by the first and second optical separating sections 203, will be described. The first and second optical signals may be set within wavelength bands different from each other, or the whole or a part of the light spectra may be set within the same wavelength band.

Figure 16:
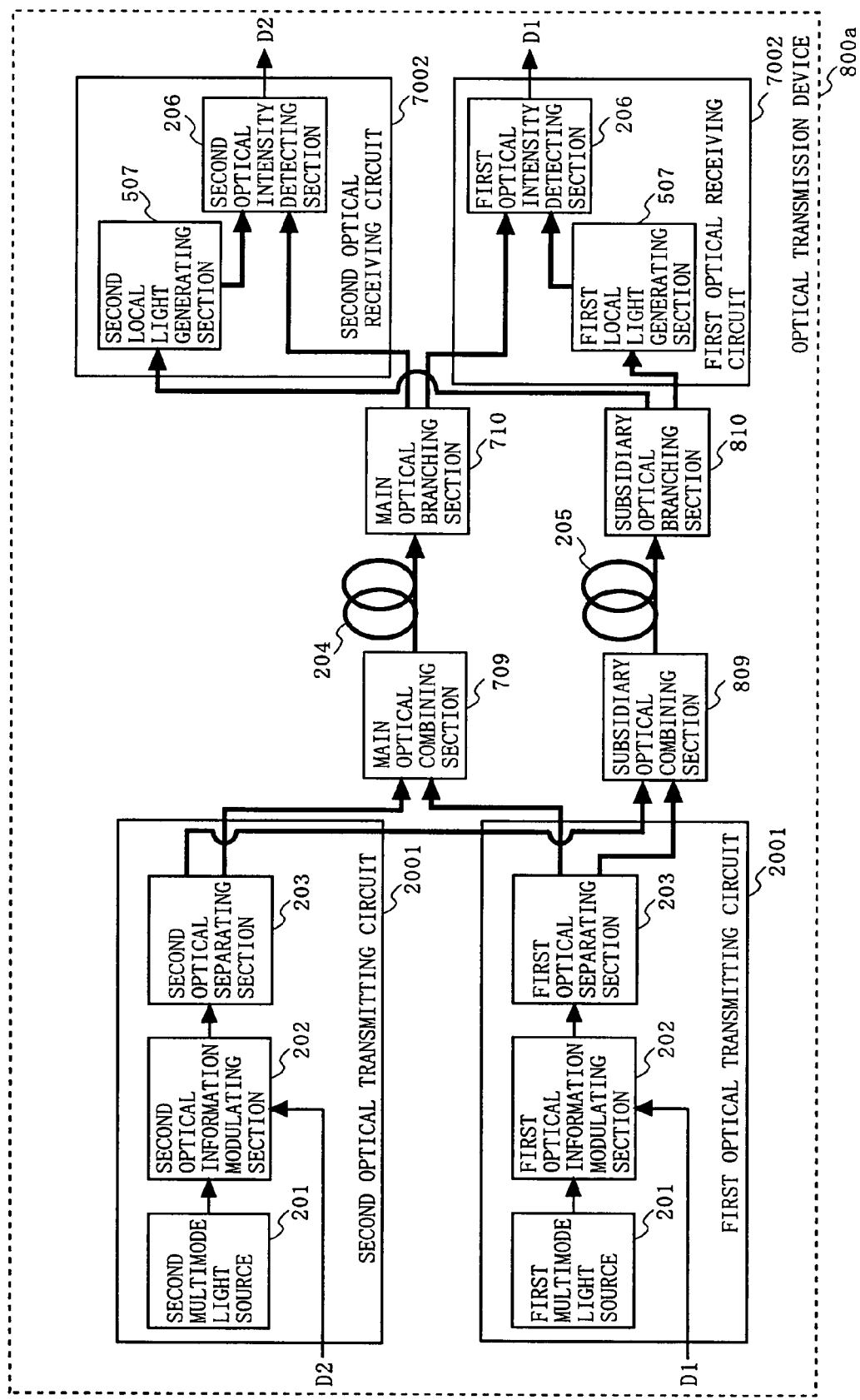
FIG. 16 is a diagram illustrating a configuration of an optical transmission device 800a when a common subsidiary optical transmission channel 205 is used where first and second optical signals are set to be within wavelength bands different from each other.

When the first and second optical signals are set to be within wavelength bands different from each other, predetermined oscillation-mode light beams extracted by the first and second optical separating sections 203 may be in any mode of a plurality of modes. When the first and second optical signals are set within wavelength bands different from each other, the subsidiary optical transmission channels 205 can be replaced with a common channel. FIG. 16 is a diagram illustrating a configuration of an optical transmission device 800a when a common subsidiary optical transmission channel 205 is used where the first and second optical signals are set to be within wavelength bands different from each other. As illustrated in FIG. 16, the optical transmission device 800a uses a subsidiary optical combining section 809 and a subsidiary optical branching section 810 to wavelength-multiplex/separate predetermined oscillation-mode light beams, thereby making it possible to transmit predetermined oscillation-mode light beams through a single subsidiary optical transmission channel 205.

Also, when the whole or a part of the light spectra of the first and second optical signals are set to be within the same wavelength band, and predetermined oscillation-mode light beams extracted from the respective first and second optical signals have the same wavelength band, the optical transmission device transmits predetermined oscillation-mode light beams through respective separate subsidiary optical transmission channels 205. On the other hand, when the whole or a part of the light spectra of the first and second optical signals are set to be within the same wavelength band, and predetermined oscillation-mode light beams extracted from the respective first and second optical signals have wavelength bands different from each other, the optical transmission device performs transmission either through separate subsidiary optical transmission channels 205, or through a single subsidiary optical transmission channel 205 as illustrated in FIG. 16.

As described above, according to the sixth embodiment, in a plurality of transmission and reception circuit pairs, noise occurring when predetermined oscillation-mode light is removed from multimode oscillating light, is utilized, and light having the same physical property as that of the predetermined oscillation-mode light is shared as a "secret key" between a sender and an authorized receiver, thereby making it possible to easily provide an optical transmission device which suppresses mutual interference and information leakage, i.e., has a high level of secrecy.

Note that, also in the configuration of FIG. 8, a plurality of pairs of an optical transmitting circuit and an optical receiving circuit may be provided, and each predetermined oscillation-mode light beam and/or remaining optical signals after extraction of each predetermined oscillation-mode light beam may be combined/branched before being transmitted. Also, in the configuration of FIG. 14, a plurality of pairs of an optical transmitting circuit and an optical receiving circuit may be provided, and a detected signal output by each optical detecting section may be combined/branched before being transmitted.

Note that, in the sixth embodiment, the first and/or second multimode light sources 201 may be replaced with the multimode light source 201a (see FIG. 10) comprising a plurality of single-mode light sources as indicated in the first variation, or may be replaced with the multimode light source 201b (see FIG. 11) comprising a plurality of single-mode light sources and an optical phase modulating section.

Seventh Embodiment

Figure 17:
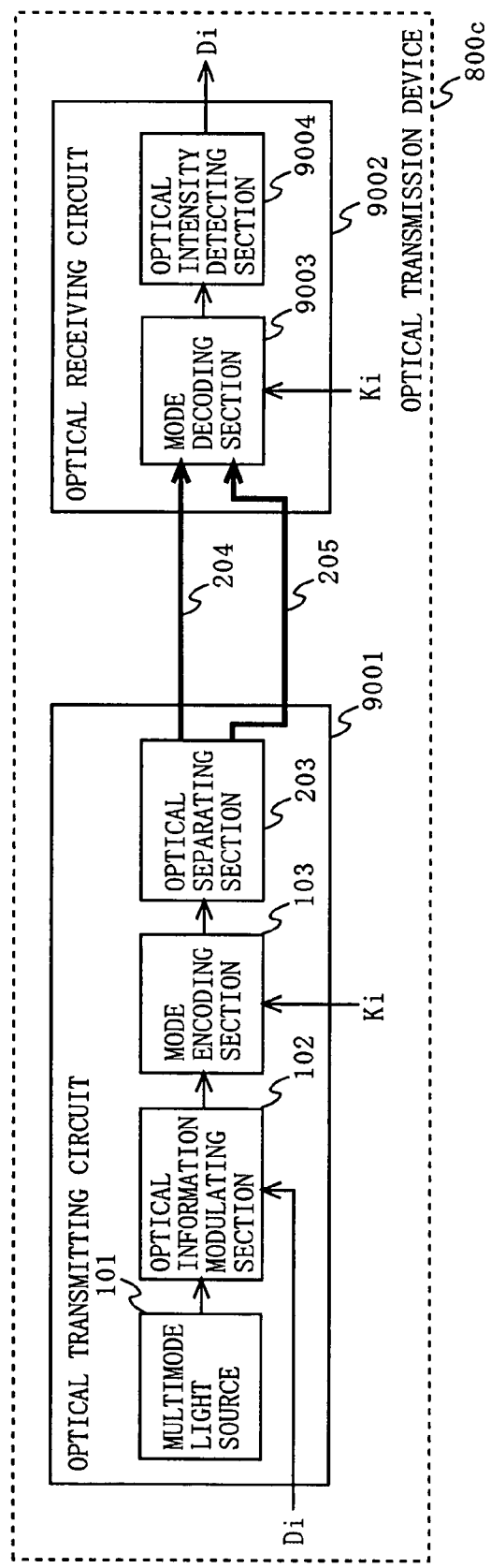
FIG. 17 is a diagram illustrating a configuration of an optical transmission device 800c according to a seventh embodiment of the present invention.

FIG. 17 is a diagram illustrating a configuration of an optical transmission device 800c supporting encrypted communication according to a seventh embodiment of the present invention. In FIG. 17, blocks for performing the same operations as those of the first embodiment of FIG. 1 are indicated by the same reference numerals and will not be described. Also, blocks for performing the same operations as those of the third embodiment of FIG. 8 are indicated by the same reference numerals and will not be described. In FIG. 17, the optical transmission device 800c comprises an optical transmitting circuit 9001 and an optical receiving circuit 9002. The optical transmitting circuit 9001 includes a multimode light source 101, an optical information modulating section 102, a mode encoding section 103, and an optical separating section 203. The optical receiving circuit 9002 includes a mode decoding section 9003 and an optical intensity detecting section 9004.

The mode encoding section 103 outputs an optical signal which has been subjected to a unique predetermined encoding operation for each oscillation-mode light beam. The optical separating section extracts at least one oscillation-mode light beam of the optical signal output from the mode encoding section 103, and transmits the oscillation-mode light beam to the subsidiary optical transmission channel 205 and remaining optical signal components to the main optical transmission channel 204. The mode decoding section 9003 combines the optical signal from the main optical transmission channel 204 and the optical signal from the subsidiary optical transmission channel 205, subjects the combined signal to a decoding operation (second operation) which has a relationship reverse to the first operation of the mode encoding section 103, and outputs the resultant light. The optical intensity detecting section 9004 squared-detects the optical signal output from the mode decoding section 9003 to detect a change in total optical intensity to detect a modulation component, thereby reproducing an original information signal Di.

Thus, in the seventh embodiment, the optical transmitting circuit 9001 subjects a plurality of oscillation-mode light beams of multimode oscillation light to an operation corresponding to a predetermined code, as a predetermined operation, using the mode encoding section 103, separates predetermined oscillation-mode light using the optical separating section 203, and outputs the predetermined oscillation-mode light to the subsidiary optical transmission channel 205 and remaining optical signal components other than the predetermined oscillation-mode light to the main optical transmission channel 204. The optical receiving circuit 9002 combines the optical signal components transmitted through the main optical transmission channel 204 and the predetermined oscillation-mode light transmitted through the subsidiary optical transmission channel 205 using the mode decoding section 9003, and subjects the oscillation-mode light beams to an operation reverse to the operation corresponding to the predetermined code using the mode decoding section 9003, thereby recovering an optical signal as it was before being subjected to the predetermined operation. Thus, by combining the first embodiment and the third embodiment, an optical communication device having an excellent level of secrecy can also be achieved.

Note that, also in the seventh embodiment, all of the above-described variations are applicable.

Eighth Embodiment

Figure 18:
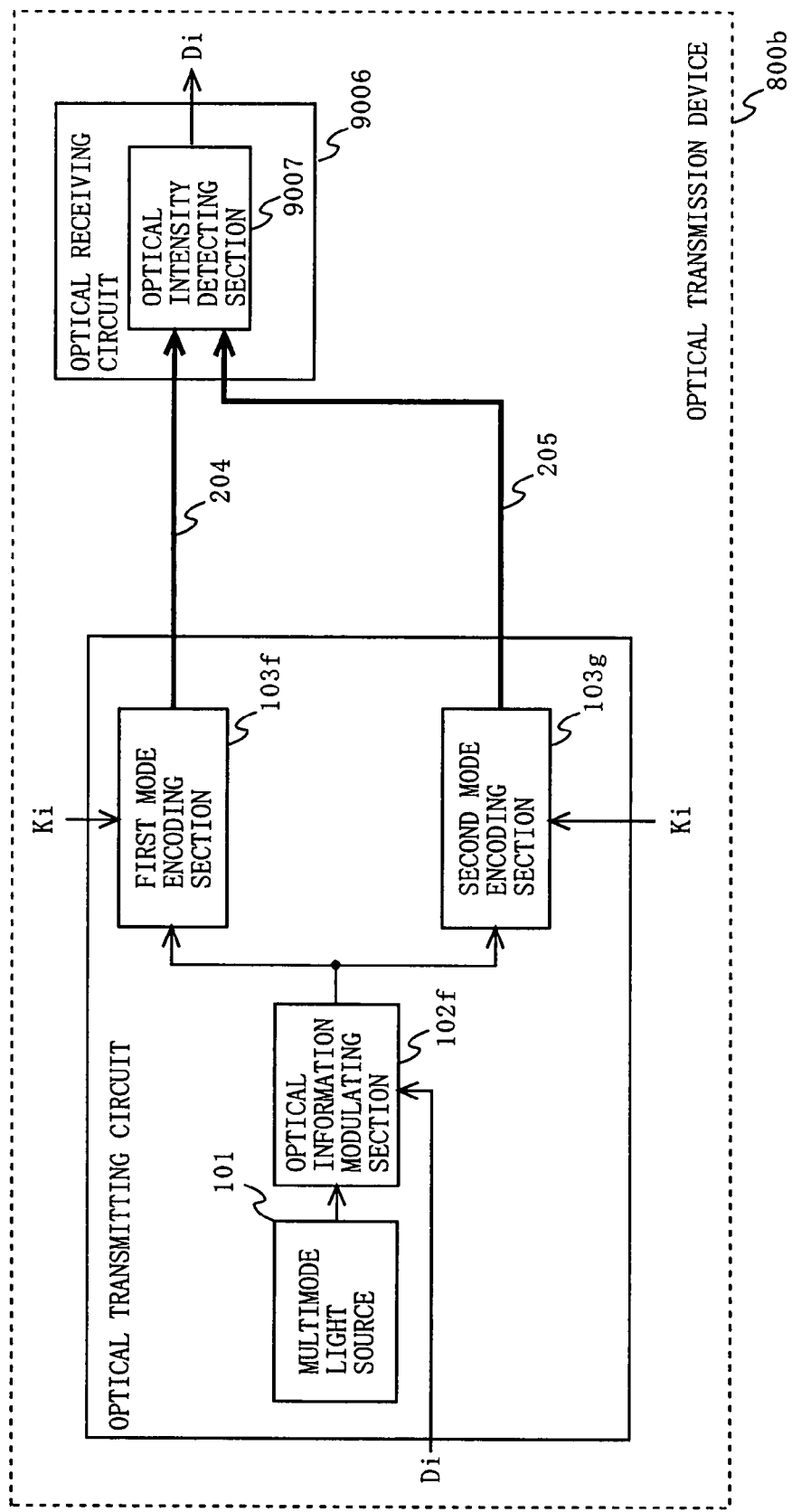
FIG. 18 is a diagram illustrating a configuration of an optical transmission device 800b according to an eighth embodiment of the present invention.
Figure 19:
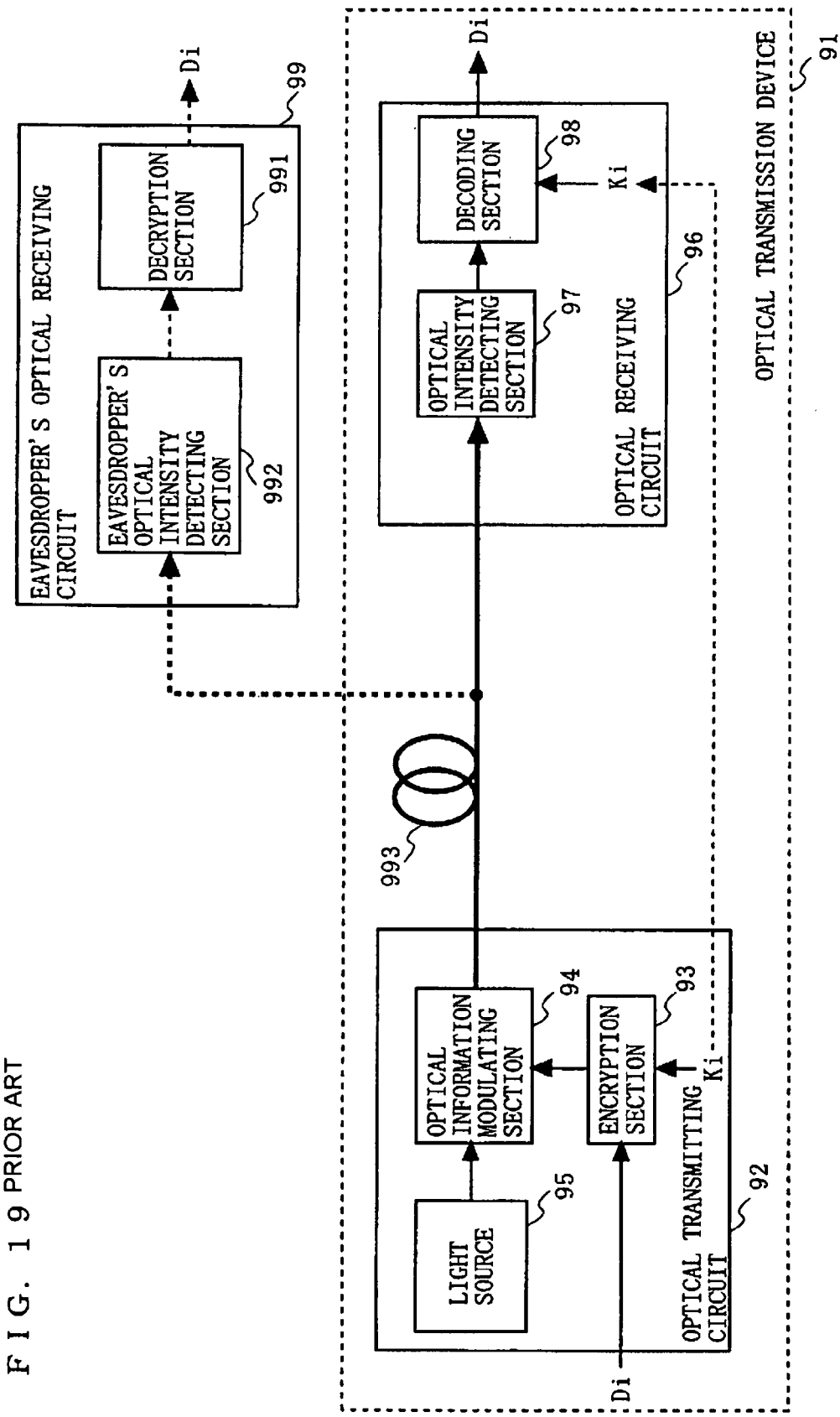
FIG. 19 is a diagram illustrating a configuration of a conventional optical transmission device 91 supporting encrypted communication.

FIG. 18 is a diagram illustrating a configuration of an optical transmission device 800b supporting encrypted communication according to an eighth embodiment of the present invention. In FIG. 18, blocks for performing the same operations as those of the first embodiment of FIG. 1 are indicated by the same reference numerals and will not be described. Also, blocks for performing the same operations as those of the third embodiment of FIG. 8 are indicated by the same reference numerals and will not be described. In FIG. 18, the optical transmission device 800b comprises an optical transmitting circuit 9005 and an optical receiving circuit 9006. The optical transmitting circuit 9005 includes a multimode light source 101, an optical information modulating section 102f, a first mode encoding section 103f, and a second mode encoding section 103g. The optical receiving circuit 9006 includes an optical intensity detecting section 9007.

The optical information modulating section 102f modulates light output from the multimode light source 101 using an information signal Di to be transmitted, and branches the result into two, which are in turn output.

One of the optical signals output from the optical information modulating section 102f is input to the first mode encoding section 103f. The first mode encoding section 103f receives the optical signal output from the optical information modulating section 102, subjects each of the oscillation-mode light beams to a predetermined encoding operation (spectrum process) unique thereto based on a predetermined source code Ki, and outputs the result to the main optical transmission channel 204.

The other optical signal from the optical information modulating section 102f is input to the second mode encoding section 103g. The second mode encoding section 103g subjects each of the oscillation-mode light beams to an encoding operation (spectrum process) which is unique thereto and has a reverse relationship (complementary relationship) with the predetermined encoding operation performed in the first mode encoding section 103f, based on the predetermined source code Ki, and outputs the result to the subsidiary optical transmission channel 205.

The optical intensity detecting section 9007 combines the optical signal transmitted through the main optical transmission channel 204 and the optical signal transmitted through the subsidiary optical transmission channel 205, and subjects the result to squared detection to detect a modulation component of a total optical intensity, thereby reproducing an information signal Di.

Thus, in the eighth embodiment, the optical transmitting circuit 9005 subjects a plurality of oscillation-mode light beams of multimode oscillation light to an operation (predetermined operation) corresponding to a predetermined code using the first mode encoding section 103f, and outputs the result to the main optical transmission channel 204. On the other hand, the second mode encoding section 103g subjects the oscillation-mode light beams of the multimode oscillation light to an operation reverse to the operation corresponding to the predetermined code, and outputs the result to the subsidiary optical transmission channel 205. The optical receiving circuit 9006 combines the optical signal transmitted through the main optical transmission channel 204 and the optical signal through the subsidiary optical transmission channel 205 to recover an optical signal as it was before being subjected to the predetermined operation. Thus, by transmitting and combining oscillation-mode light beams having a reverse relationship with each other, an optical communication device having an excellent level of secrecy can also be achieved.

Note that, also in the eighth embodiment, all of the above-described variations are applicable.

While the invention has been described in detail, the foregoing description is in all aspects illustrative and not restrictive. It is understood that numerous other modifications and variations can be devised without departing from the scope of the invention.

INDUSTRIAL APPLICABILITY

The optical transmission device of the present invention utilizes an unpredictable noise component included as a physical property (natural phenomenon) in light, thereby making it possible to achieve encrypted communication which cannot be analyzed or decrypted by computer processes, and therefore, is useful in the field of communications or the like.

The invention claimed is:

1. A multimode optical transmission device for transmitting a multimode optical signal modulated using an information signal to be transmitted, comprising:

an optical transmitting circuit for modulating multimode oscillation light using the information signal, subjecting at least one oscillation-mode light beam of a plurality of oscillation-mode light beams of the modulated multimode oscillation light to a predetermined operation, and outputting the result to an optical transmission channel; and an optical receiving circuit for receiving an optical signal transmitted through the optical transmission channel, subjecting the received optical signal to an operation reverse to the predetermined operation to recover an optical signal as it was before being subjected to the predetermined operation, and converting the recovered optical signal into an electrical signal, thereby reproducing the information signal, wherein the predetermined operation changes a correlation relationship between the plurality of oscillation-mode light beams, the optical transmitting circuit subjects the plurality of oscillation-mode light beams of the multimode oscillation light to an operation corresponding to a predetermined code as the predetermined operation, and outputs the result to the optical transmission channel, the optical receiving circuit receives light transmitted through the optical transmission channel, subjects the plurality of oscillation-mode light beams of the received light to an operation reverse to the operation corresponding to the predetermined code to recover an optical signal as it was before being subjected to the predetermined operation, detects a change in total optical intensity of the plurality of oscillation-mode light beams, and converts the recovered optical signal into an electrical signal, thereby reproducing the information signal, the optical transmitting circuit includes:

a multimode light source for outputting multimode oscillating light;

an optical information modulating section for modulating the light output from the multimode light source using an information signal, and outputting the modulated optical signal; and a mode encoding section for receiving the optical signal output from the optical information modulating section, subjecting a plurality of oscillation-mode light beams of the received optical signal to a first operation corresponding to the predetermined code, wherein the first operation is an operation of providing a predetermined amount of polarization change corresponding to the predetermined code to each of a plurality of oscillation-mode light beams of an input optical signal, and outputting the result to the optical transmission channel, and the optical receiving circuit includes:

a mode decoding section for receiving an optical signal transmitted through the optical transmission channel, subjecting a plurality of oscillation-mode light beams of the received optical signal to a second operation having a reverse relationship with the first operation corresponding to the predetermined code, wherein the second operation is an operation of providing a polarization change having a polarity reverse to the predetermined amount of polarization change corresponding to the predetermined code, to each of a plurality of oscillation-mode light beams of an input optical signal, and outputting the result; and an optical intensity detecting section for detecting a change in total optical intensity of an optical signal output from the mode decoding section, and converting the optical signal into an electrical signal, to reproduce the information signal.

2. A multimode optical transmission device for transmitting a multimode optical signal modulated using an information signal to be transmitted, comprising:

an optical transmitting circuit for modulating multimode oscillation light using the information signal, subjecting at least one oscillation-mode light beam of a plurality of oscillation-mode light beams of the modulated multimode oscillation light to a predetermined operation, and outputting the result to an optical transmission channel; and an optical receiving circuit for receiving an optical signal transmitted through the optical transmission channel, subjecting the received optical signal to an operation reverse to the predetermined operation to recover an optical signal as it was before being subjected to the predetermined operation, and converting the recovered optical signal into an electrical signal, thereby reproducing the information signal, wherein the predetermined operation changes a correlation relationship between the plurality of oscillation-mode light beams, the optical transmitting circuit subjects the plurality of oscillation-mode light beams of the multimode oscillation light to an operation corresponding to a predetermined code as the predetermined operation, and outputs the result to the optical transmission channel, the optical receiving circuit receives light transmitted through the optical transmission channel, subjects the plurality of oscillation-mode light beams of the received light to an operation reverse to the operation corresponding to the predetermined code to recover an optical signal as it was before being subjected to the predetermined operation, detects a change in total optical intensity of the plurality of oscillation-mode light beams, and converts the recovered optical signal into an electrical signal, thereby reproducing the information signal, the optical transmitting circuit includes:

a multimode light source for outputting multimode oscillating light;

an optical information modulating section for modulating the light output from the multimode light source using an information signal, and outputting the modulated optical signal; and a mode encoding section for receiving the optical signal output from the optical information modulating section, subjecting a plurality of oscillation-mode light beams of the received optical signal to a first operation corresponding to the predetermined code, wherein the first operation is an operation of providing a predetermined amount of frequency change corresponding to the predetermined code to each of a plurality of oscillation-mode light beams of an input optical signal, and outputting the result to the optical transmission channel, and the optical receiving circuit includes:

a mode decoding section for receiving an optical signal transmitted through the optical transmission channel, subjecting a plurality of oscillation-mode light beams of the received optical signal to a second operation having a reverse relationship with the first operation corresponding to the predetermined code, wherein the second operation is an operation of providing a frequency change having a polarity reverse to the predetermined amount of frequency change corresponding to the predetermined code, to each of a plurality of oscillation-mode light beams of an input optical signal, and outputting the result; and an optical intensity detecting section for detecting a change in total optical intensity of an optical signal output from the mode decoding section, and converting the optical signal into an electrical signal, to reproduce the information signal.

* * * * *